United States Patent [19]

Duroux

[11] Patent Number: 4,918,920
[45] Date of Patent: Apr. 24, 1990

[54] HYDRAULIC REMOTE CONTROL DEVICE FOR CONTROLLED MEMBERS, SUCH AS EXTERNAL REAR VIEW MIRRORS ON VEHICLES

[75] Inventor: Bernard Duroux, Garancieres, France

[73] Assignee: Britax (GECO) S.A., Vulaines sur Seine, France

[21] Appl. No.: 207,054

[22] PCT Filed: Sep. 29, 1987

[86] PCT No.: PCT/FR87/00371

§ 371 Date: May 24, 1988

§ 102(e) Date: May 24, 1988

[87] PCT Pub. No.: WO88/02322

PCT Pub. Date: Apr. 7, 1988

[30] Foreign Application Priority Data

Oct. 2, 1986 [FR] France .................... 86 13776

[51] Int. Cl.$^5$ .................................. F15B 7/02
[52] U.S. Cl. .......................... 60/536; 60/569;
60/591; 74/502.1; 350/637
[58] Field of Search ............ 60/536, 533, 568, 569,
60/591; 92/48, 89–92; 350/636, 632, 607, 631,
639, 637; 74/502.1, 479

[56] References Cited

U.S. PATENT DOCUMENTS

| | | | |
|---|---|---|---|
| 2,373,745 | 4/1945 | Conway | 60/536 X |
| 2,667,184 | 1/1954 | Hailer et al. | 92/98 R |
| 2,906,098 | 9/1959 | Mayo | 350/636 X |
| 2,906,292 | 9/1959 | Mayo | 350/636 X |
| 3,013,392 | 12/1961 | Falge et al. | 60/536 X |
| 3,047,257 | 7/1962 | Chester | 92/92 X |
| 3,873,190 | 3/1975 | Hess | 74/502.1 X |
| 4,701,037 | 10/1987 | Bramer | 350/637 X |
| 4,732,463 | 3/1988 | Mittelhauser | 350/632 |
| 4,768,871 | 9/1988 | Mittelhauser et al. | 92/92 X |

FOREIGN PATENT DOCUMENTS 2363017 3/1978 France .................... 74/502.1

Primary Examiner—Edward K. Look
Attorney, Agent, or Firm—Frost & Jacobs

[57] ABSTRACT

The device comprises a manipulator (148) whose body (149) houses deformable positioning transmitter bags (145 to 147) each connected by a corresponding hydraulic circuit to a positioning receiver comprising a deformable bag (130 to 132, 133 to 135), whose increases in volume in response to the compression exerted by the user on at least one of the positioning transmitter bags (145 to 147 control a change of the positioning of at least one controlled member. The device may contain a connector connecting the transmitter bags to the receiver bags, and also path switching hydraulic circuits permitting the selective control of one of two different members by a single manipulator. Application in particular to the control of external rear view mirrors on vehicles.

26 Claims, 11 Drawing Sheets

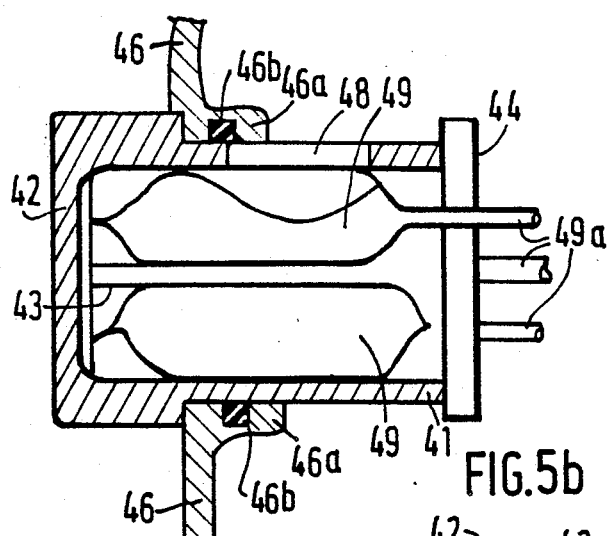
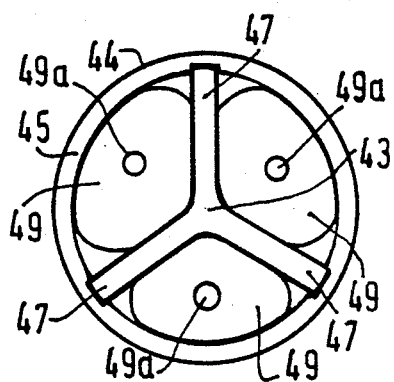
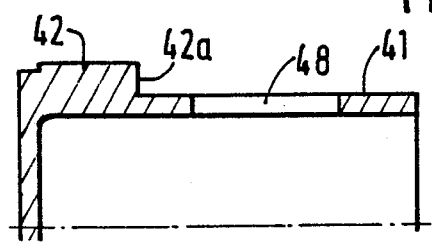
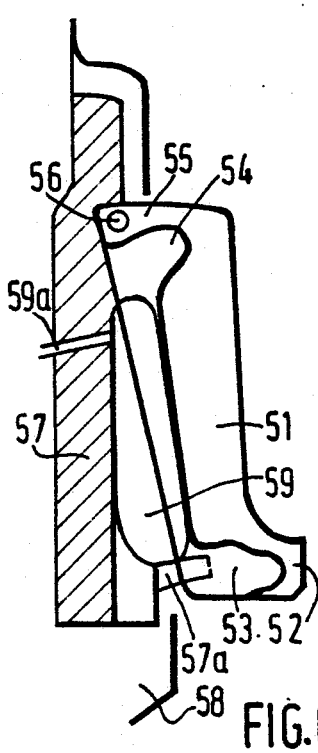
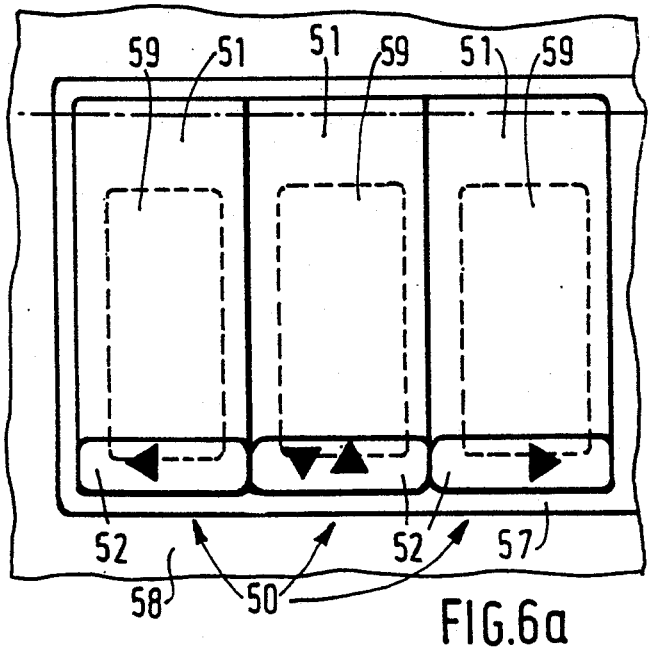

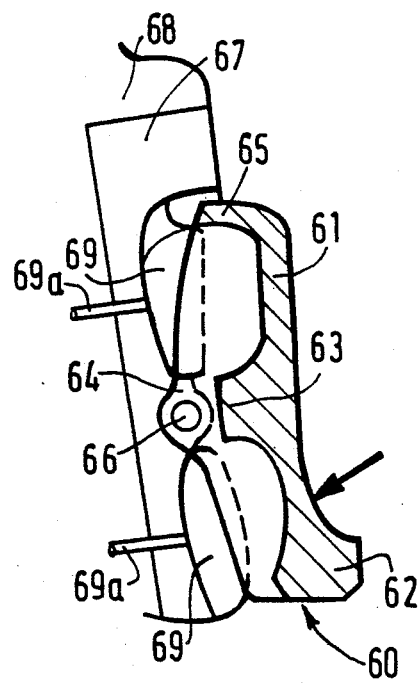
FIG.7b
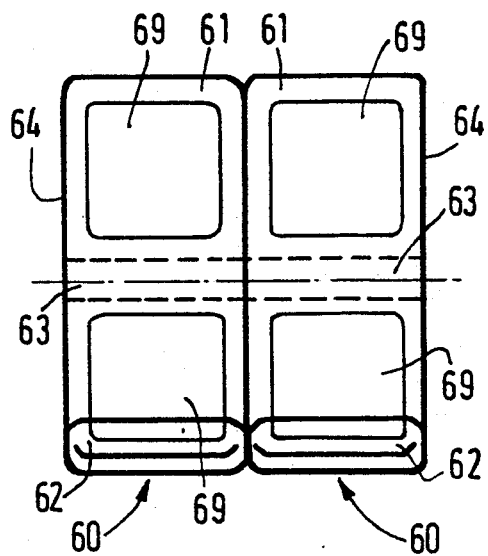
FIG 7a
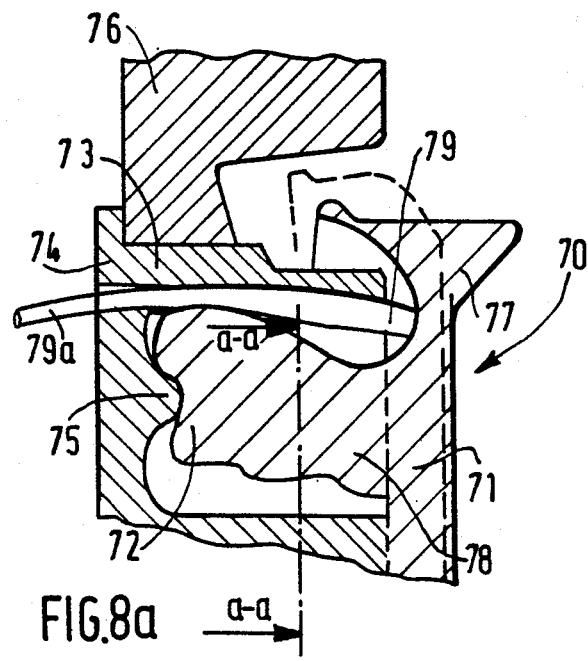
FIG.8a
FIG.8b

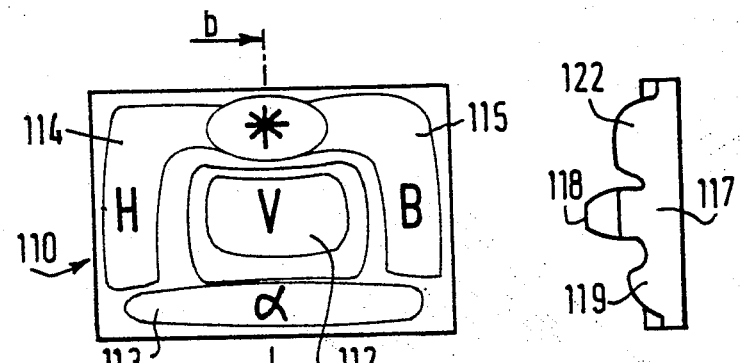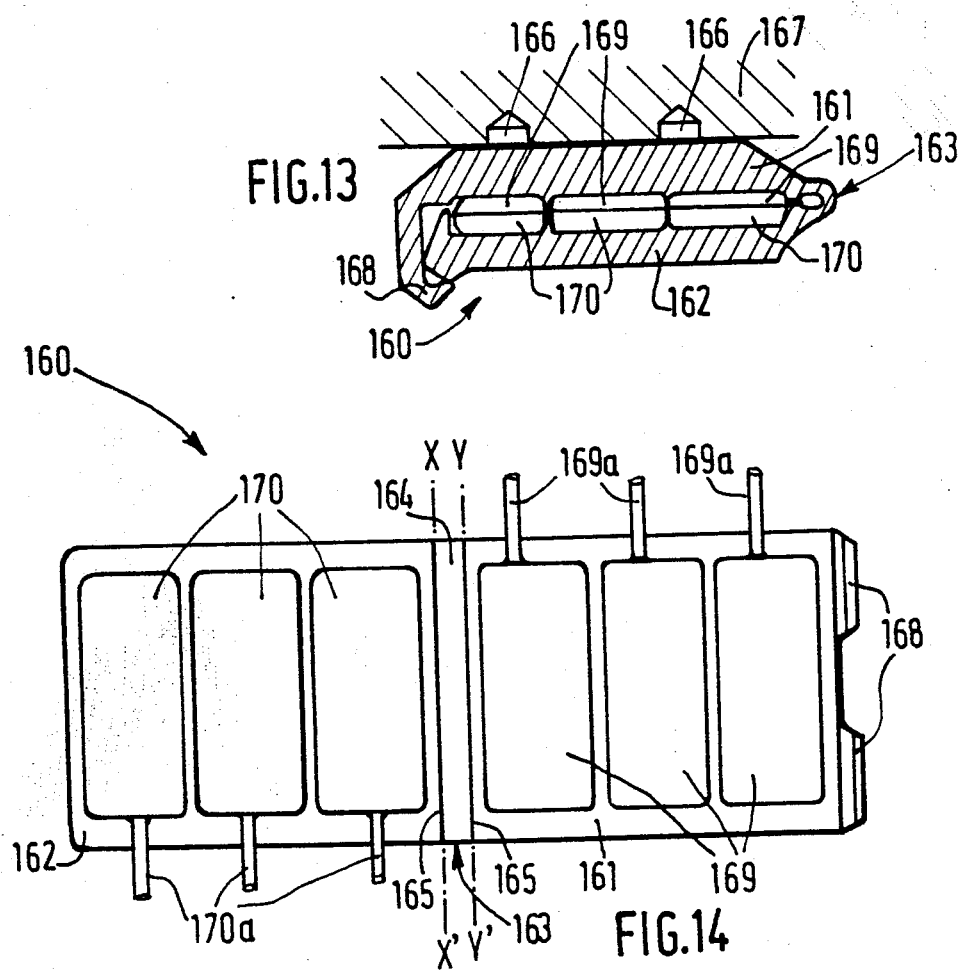

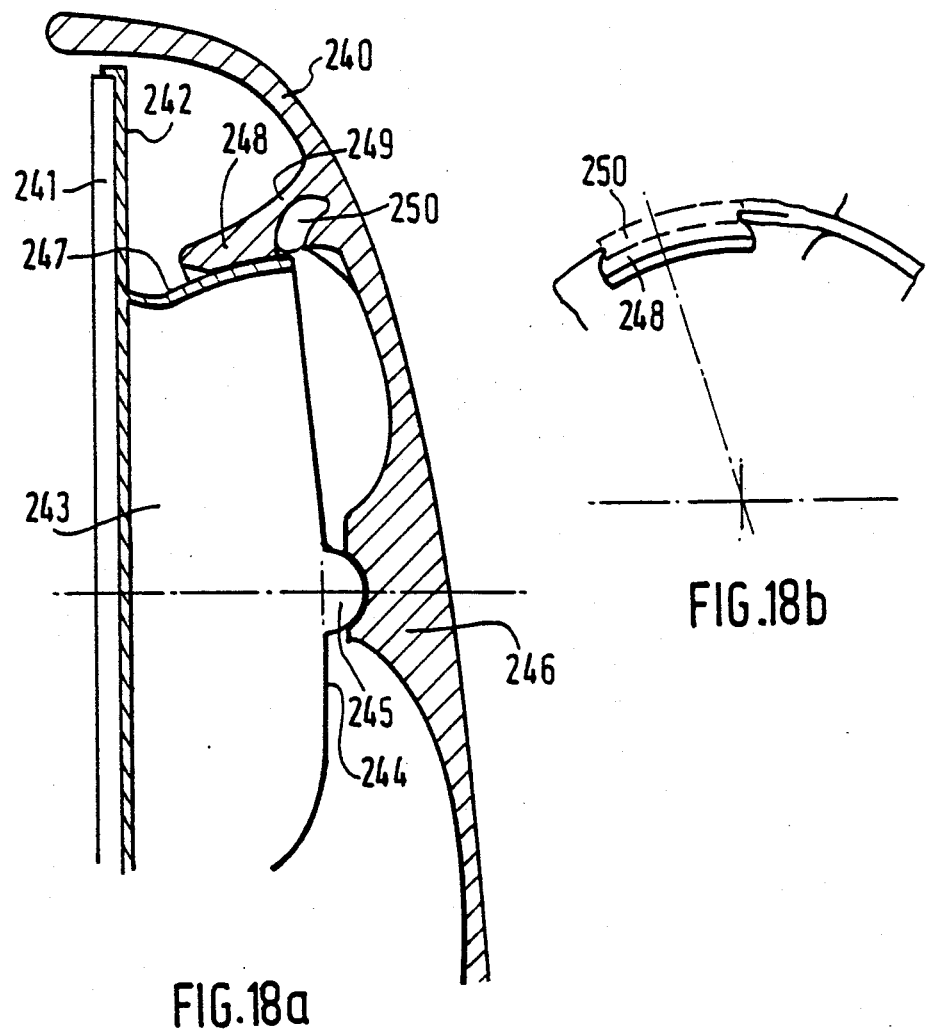
FIG.18a
FIG.18b
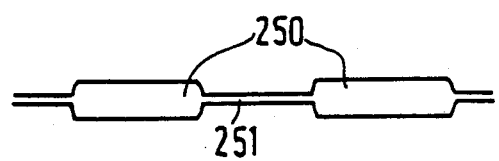
FIG.18c

HYDRAULIC REMOTE CONTROL DEVICE FOR CONTROLLED MEMBERS, SUCH AS EXTERNAL REAR VIEW MIRRORS ON VEHICLES

The present invention relates to a hydraulic remote control device for at least one adjustable and/or lockable controlled member mounted on a support, such as a rear view mirror, particularly an external rear view mirror for an automobile vehicle, whose orientation it is desired to adjust from the driver's seat inside the vehicle, the hydraulic remote control device according to the invention also being utilizable to adjust the position of other members requiring positioning by pivoting, particularly about two axes at right angles to one another.

Among the numerous known constructions of devices arranged for this purpose, the invention relates more precisely to hydraulic remote control devices of the type comprising:
a manually operated control member or manipulator, and
at least two but preferably three hydraulic positioning circuits, each comprising:
a positioning transmitter, which is a fluid pressure transmitter comprising a flexible walled deformable bag containing a hydraulic fluid,
at least one positioning receiver, which is a fluid pressure receiver having a variable volume chamber, and
at least one line connecting the transmitter to each corresponding receiver,
said hydraulic circuits being such that the flexible walled bag of the positioning transmitter of at least one hydraulic circuit is mechanically deformed by the manual actuation of the control member, in such manner that hydraulic fluid contained therein is transferred to at least one of the receivers connected thereto, and the receivers mechanically connect the controlled member to its support in order to modify the position of the controlled member relative to its support in response to the operations of the control member.

A device of this kind is described in the European Patent Application published under No. 0152 219, which lists the very important advantages provided by a device of this kind in comparison with previous constructions of the prior art comprising transmissions by levers, linkages or rod systems, movement transmissions utilizing cables, or else electric motors, these advantages being briefly outlined below. Arrangements using levers, although generally fairly simple in construction, do not make it possible to control the external rear view mirror situated on the passenger's side from the driver's seat, because the required path is not a straight line; the disadvantages of these arrangements are therefore connected with the presence of bends, the considerable weight of linkages, and friction, which makes such embodiments usually scarcely progressive. Arrangements comprising three movement transmission cables are easier to instal than lever arrangements, but they do not make it possible to control the orientation of the external rear view mirror on the passenger's side because, as the result of friction, the effective length of the control cables is limited to about 50 centimeters, while beyond that length the operating forces increase very substantially and have the consequence that the control device is scarcely progressive and is very difficult to adjust. Finally, devices using electric motors make it possible to control all the external rear view mirrors on the vehicle from the driver's seat, irrespective of the path followed by the electric wires between these rear view mirrors and the parts of the instrument panel and/or supports disposed inside the vehicle and accessible to the driver; however, the major disadvantage of arrangements of this kind is the cost of the electric motors and the space which they require in the rear view mirrors.

In the different examples of embodiment of the hydraulic control device which are described in the aforesaid European patent application, the manually actuated control member is always a manipulator handle or stick pivotally mounted or articulated on the cover of a casing containing the flexible walled chambers of the positioning transmitters. The manipulator handle or stick is always mechanically connected to at least one rigid member, which is likewise mounted inside the casing, in such a manner that the pivoting movements made by the user with the manipulator handle or stick are transmitted with or without stepping down of the transmission ratio to at least one of said internal rigid members, which has or have the effect of compressing at least one flexible walled deformable bag of the positioning transmitters.

The hydraulic remote control device forming the object of the abovementioned European patent application consequently has the disadvantages that the assembly comprising the manipulator and the positioning transmitters is an expensive assembly, on the one hand because of the large number of components thereof, and on the other hand because the assembly of these components is a delicate operation. Furthermore, in all the examples of embodiment the manipulator handle or stick is in the form of a lever projecting into the interior of the passenger compartment of the vehicle, relative to the instrument panel, which is dangerous in respect of the safety of persons travelling in the vehicle and is not necessarily in harmony with the style intended for the driver's cab and the board or instrument panel. In addition, although the installation of the hydraulic devices offers the same advantages as that of the supply lines for electric motors, where the path followed from the driver's cab to the external rear view mirrors which are to be controlled is concerned, it is nevertheless true that the hydraulic devices have the specific disadvantage that in the event of the fracture of a deformable bag, a rear view mirror, or a connecting pipe, all the corresponding hydraulic circuits have to be dismounted and replaced, and it is for that reason that it has already been proposed to equip the device described in the aforesaid European patent application with a hydraulic connector for each hydraulic control circuit, this hydraulic connector comprising two variable volume chambers, one of which is constantly in communication with the deformable bag of the corresponding positioning transmitter, while the other is constantly in communication with the variable volume chamber of the corresponding positioning receiver, the two variable volume chambers of the connector being maintained by mechanical means in the configuration for the transfer of pressure from one to the other.

By means of the present invention it is contemplated to obviate the various disadvantages attached to the hydraulic control device described in the abovementioned European patent application and also to bring improvements to various components of said device.

In particular, the invention proposes a simple, economic, reliable device for any distance and path between the manually actuated control device and the components controlled, which utilizes hydraulic circuits substantially free from friction at the sites of the manually actuated control member or manipulator and of the connecting pipes.

Furthermore, the invention aims to provide a device which is unrestricted in respect of shape, so that it can be adapted to all styles of driver's cab.

A further aim of the invention is to provide a device in which the volume of the manipulator and of the positioning transmitters is reduced in order to facilitate their installation in an instrument panel.

The remote control of a controlled member such as an external rear view mirror situated on the passenger's side of the vehicle must obviously be possible under the same conditions from the driver's cab and at low cost, and the entire device will advantageously be partially dismountable because of the provision of hydraulic connectors, in the event that it should be necessary to replace a component such as a positioning transmitter or receiver.

The principle underlying the device according to the invention consists in directly utilizing deformable bags of hydraulic fluid not only in the positioning transmitters, but preferably also in the positioning receivers, in order that a certain volume of hydraulic fluid will be transferred from the transmitter to the corresponding receiver of a hydraulic circuit in accordance with requirements. Flexible walled deformable bags may occupy practically any position in space, and in particular three of them may be disposed in circumferential directions, each at an angle to the center of about 120°, or they may occupy positions at 120° to one another, in order to allow the control of the orientation of adjustable members, such as rear view mirrors for vehicles. The use of flexible walled deformable bags in the transmitters additionally makes it possible to a certain extent to achieve freedom from restrictions in respect of shape for the variable volume chambers bounded by these bags. However, it remains necessary to hold or clad these positioning transmitter bags in supports which may have any shape dictated by style and may thus at the same time serve as embellishers, whether such supports are in the form of fixed or movable members, and without any mechanical component, such as a piston, a jack, or the like, being interposed between any movable holder component for a positioning transmitter bag and the bag itself.

Another principle which may be applied simultaneously consists according to the present invention—and for the purpose of utilizing practically all the volume of hydraulic fluid available in each hydraulic circuit—in making use of cams associated with the manually actuated control member in such a manner as to drive out, through compression, practically the entire volume of fluid originally contained in the deformable bag of the corresponding transmitter. Similarly, cams may be provided to act on the deformable bags of the positioning receivers in such a manner that only the internal volume of the connection pipes may be considered as dead volume. In this case a third principle will be able to be advantageously applied in the device according to the invention, namely special arrangements of deformable bags which for example overlap and combining their actions with special shapes given to the cams in order to obtain special effects, such as the sequential transmission of an unlocking or releasing command followed by at least one positioning command, in response to a manipulation of the manually actuated control member.

In addition, in different possible applications of the device according to the invention the locking or securing of controlled members may be necessary. In these different cases the locking or securing function will advantageously be served without the deformable bags being placed under high pressure.

Although in all cases the volume of the deformable bags is linked to the function which it is desired that these bags should serve, it should be noted that the remote control device according to the present invention is limited in its applications to the control of all the controlled members which require only adjustments made over short distances, as is the case with rear view mirrors or spotlights, and also of certain components needing locking, such as spotlights and openable vehicle roofs, or also vehicle doors which it is desired to be able to lock from the inside.

Finally, a further principle utilized in the device according to the invention, for the purpose of limiting the number of manually actuated control members or, for a given number of such members, in order to increase the number of members controlled, will consist in providing path switching for the hydraulic fluid flowing from a deformable bag of a transmitter to one or the other of a plurality of variable volume chambers of receivers associated with said transmitter.

In order to achieve the aims indicated above, the invention provides a hydraulic remote control device of the type mentioned above, which is characterized by the fact that the flexible walled deformable bag of each positioning transmitter is mounted directly in the manually actuated control member.

In a first particular embodiment specific to the invention the manually actuated control member is a direct contact manipulator button comprising a rigid casing delimiting on the one hand an internal space for each of the flexible walled bags and on the other hand at least one opening directly facing at least one portion of the flexible wall of each deformable bag, for the purpose of permitting the deformation of each bag by direct pressure applied by the user to its flexible wall accessible through said opening. The advantage of a construction of this kind is that the external shape of the manipulator button may be of practically any kind and is in particular well suited to the style of the instrument panel. In particular, the rigid casing may comprise a substantially cylindrical casing closed, at least partially, on one side by a cover and at least partially surrounding an internal body which, together with the casing and/or with the cover, delimits three compartments, which are preferably regularly distributed over the inside periphery and each of which houses one of the flexible walled bags in such a manner as to isolate it from the other two bags, the openings for applying direct pressure to the bags being formed in the casing and/or in the cover. Another advantage of a construction of this kind is that the position of the pipes connecting positioning transmitters to the deformable bags is immaterial. However, in a variant, which is advantageous from the point of view of the protection of the connecting pipes, the casing is closed on the opposite side to the cover by a face which has holes formed in it for the passage of pipes connecting the deformable bags and which supports the internal body provided with three projecting separator arms which delimit pairs of compartments receiving the deformable bags thus isolated from one another by the arms of the internal body.

In another variant, which is advantageous because it makes it possible to provide maximum protection for the manipulator button at times when no pressure must be applied to any of the deformable bags of the positioning transmitters, the internal body, the cover which has no openings, and the casing whose side surface is provided with all the openings for applying pressure to the deformable bags are mounted for movement as a single piece in relation to a support between two end positions, of which one is a retracted position in which the casing is locked by a locking mechanism on the support in such a manner that only the cover projects outside the support, while the other position is an operating position in which the casing projects at least partially outside the support, so that the openings for applying pressure to the deformable bags are freely accessible to the user.

In yet another variant of the manipulator button, which is advantageous in cases where the controlled member is a safety member, which must not be capable of being inadvertently or inopportunely operated, the rigid casing is in the form of a dish which has a closed bottom and in which the deformable bags are retained and disposed around a central rod fastened to the dish and connecting the latter to a base for the fastening of the manipulator on a support, the base being spaced apart and facing at least one opening in the dish offering access to the deformable bags connected to the connecting pipes which pass through the central rod.

In another variant construction of the device according to the invention the manually actuated control member is a linear manipulator comprising a plurality of pushbuttons disposed side by side, each having a pusher mounted for pivoting about a rocking axis on a base fastening the pushbutton to a support, at least one deformable bag being interposed between each rocking pusher and the base. In this case also the advantage of this construction is that the shape of the pushbutton is independent of the operation and can be adapted to all styles of instrument panels. Another advantage is that the constructional principle of a manually actuated control member of this type can be extended to any number of pushbuttons, each being provided with a deformable bag. In one particular example of embodiment of a linear manipulator of this kind the latter comprises at least three pushbuttons which are disposed side by side and whose pushers pivot, near one of their ends and on the same side of the manipulator, about a common rocking pin carried by a common base in which apertures are formed for the passage of the pipes, each of which is connected to the single deformable bag housed between each pusher and the common base.

In another example of embodiment, which is advantageous because two deformable bags are associated with each pushbutton, the linear manipulator comprises at least two pushbuttons, which are disposed side by side and each of whose pushers pivots in its central part about a common rocking pin carried by a common base provided, opposite each pusher, with two apertures for the passage of the pipes connected to the two deformable bags housed between each pusher and the common base, one on each side of the rocking pin. This constructional principle may be extended to any number of rocking pushbuttons each comprising two deformable bags. It is thus possible to obtain four functions with two rocking pushbuttons each of which is associated with two bags, so that this device makes it possible to reduce the space required for its control member, while including an additional function, which may for example be an unlocking or release function. It should be noted that an embodiment of this kind is also well suited to practically any shape of instrument panel.

In yet another example of the device according to the invention the manually actuated control member is an oscillating manipulator comprising a tubular body for fastening the manipulator to a support, and an oscillating pusher guided by a ball-and-socket joint in the tubular body and engaged in the latter by a portion forming a cam deforming at least three deformable bags distributed, preferably regularly, inside the tubular body, the oscillating pusher also being provided with a push plate which is disposed outside the tubular body and which, when any eccentric thrust is applied to it, gives rise to a relative displacement of the tubular body and of the pusher, thereby compressing at least one deformable bag.

In another advantageous variant of this example of embodiment the portion of the pusher which forms a cam is a head ball-jointed on an end face of the tubular body and attached to the push plate by a thinner portion which together with the tubular body delimits at least one cavity housing bags distributed around the head. In this case, since at least one bag is always at least partly filled when the device is assembled, the oscillating pusher cannot be detached after the device has been placed in position.

As previously, the volume of the bags is dependent on the amplitude of the displacements designed for the controlled member. In this example the shape of the cam inside the pusher will make it possible to empty the bags and to make use of all the liquid available in them. In this type of embodiment the section of the oscillating pusher is not necessarily circular, and in particular the head of the oscillating pusher may have the external shape of a cam comprising at least three lobes compressing deformable bags. A construction of this kind makes it possible to give priority to displacements along certain axes, particularly when each lobe faces a deformable bag, but in addition with the aid of this device it is also possible to displace a controlled member along two axes at the same time when the lobes bear at least partially against two deformable bags simultaneously. In order that the outside shape of the oscillating manipulator may be independent of these functions and be adaptable to the style of the driver's cab in the vehicle, it is advantageous for that portion of the pusher which forms the cam to be a skirt whose external face is at least partially shaped as a convex spherical dome mounted as a ball joint in a concave spherical dome forming a bearing surface inside the tubular body, and for the inner face of the skirt to delimit, in conjunction with a boss engaged in the skirt and fastened to the tubular body, at least one cavity housing deformable bags distributed around the boss, and inside the skirt.

In yet another embodiment of the device according to the invention the manually actuated control member is a pusher type manipulator mounted floatingly on a base fastening the manipulator to a support, and having at least three cavities receiving deformable bags, facing which the pusher is provided with cams for the compression of the deformable bags when a thrust is applied to the pusher. In an embodiment of this kind, which is advantageous because of its structural simplicity, it is possible for at least two deformable bags to overlap partially facing a pusher cam whose approach stroke relative to the bags is shorter, when the pusher is moved towards the base, than the approach strokes of the cams facing non-overlapping portions of the two partially overlapping bags. It is clear that the actuation of the floating manipulator in the overlap zone of two deformable bags makes it possible to control simultaneously the positioning of the controlled member in two different directions, in addition to the fact that the corresponding control stroke is very short.

In a variant of an embodiment of the floating manipulator having overlapping bags the base has an additional central cavity housing an additional central deformable bag, around which are distributed the other deformable bags which are not overlapped by the central bag, and the pusher has a central cam facing the central bag and provided with a spherical bearing surface in order to allow the simultaneous compression of the central bag and of at least one other bag, the approach stroke of the central cam towards the central bag being the shortest of the approach strokes of the different cams of the pusher, while the total stroke of the central cam is such that, when it has been accomplished and at least two bags have an overlap zone, a cam facing the overlap zone is flush with the overlapping portions of the two corresponding bags. A device of this kind makes it possible to add an unlocking control function for an oriented rear view mirror by acting on the bags other than the central bag. This floating manipulator is also adaptable to any style of instrument panel, because the functions served are relatively independent of the shapes selected.

If it is desired to be able to control a plurality of movable members which are adjustable with the aid of simple adjustment means, according to another characteristic specific to the invention it is advantageous for the manually actuated control member to be a path switching manipulator making possible the selective control of one or the other of two controlled members, the position of each of which is determined by at least two, but preferably three fluid pressure positioning receivers of the deformable receiver bag type, the manipulator comprising on the one hand a body housing a corresponding number of positioning transmitters of the deformable transmitter bag type, each of which is connected in parallel by connection pipes to two positioning receivers each associated with one of the two controlled members, and on the other hand two fluid pressure obturating transmitters, likewise of the deformable transmitter bag type, each of which is connected by a connection pipe to a fluid pressure obturating receiver of the deformable receiver bag type, which is held by mechanical means i a pressure transmission relationship with each of a corresponding number of deformable isolator bags, each of which is situated upstream of one of the deformable receiver bags of the positioning receivers associate with one of the controlled members, in such a manner that the compression of an obturating transmitter bag transfers fluid to the obturating receiver bag which is connected to it and which is placed under pressure and increases in volume in such a manner as to compress simultaneously the isolator bags upstream of the positioning receiver bags of the corresponding controlled member, in order to cut communication between these positioning receiver bags and the positioning transmitter bags of the manipulator which remain in communication with the positioning receiver bags associated with the other controlled member.

When the control device according to the invention contains a path switching manipulator of this kind, it is advantageous, in one embodiment which is of simple construction and easy to actuate, for the manipulator body to be fastened to a base mounted on a support for pivoting about a pivot axis, on each side of which the base has a cavity, each of which cavities houses, at least partially, one of the two obturating transmitter bags which are retained on the support, in such a manner that the pivoting of the manipulator on the support, on one side or the other of the axis, brings about the compression of one of the obturating transmitter bags, that is to say the control of the obturation of one of the paths leading to one of the controlled members, so that only the other member can be controlled (positioned, adjusted or locked). In order to connect connection pipes which, if they were each in one single piece, would be too long and too difficult to instal, it is advantageous to use, as already proposed in the previously mentioned European patent application, at least one detachable connector in each of the hydraulic circuits of the device. In this case each detachable connector comprises a deformable receiver connection bag connected by a connection pipe to the deformable bag of a corresponding transmitter, and the connector also comprises a deformable transmitter connection bag connected by a connection pipe to a deformable bag of the corresponding receiver, and the connector finally comprises a casing housing the transmitter and receiver connection bags, holding them bearing one against the other in order that the pressure exerted on the receiver connection bag will be transmitted to the transmitter connection bag. According to the invention it is then advantageous for the casings of the detachable connectors to consist of a single connector body comprising two panels which fold over and are detachably fastened one against the other, and each of which has an equal number of at least two, but preferably at least three, cavities each of which comes to face a cavity in the other panel when the two panels are folded over and fastened one against the other, the transmitter bags of the connections each being disposed in one of a corresponding number of cavities in a panel which come to face the cavities in the other panel, in each of which cavities is disposed one of the receiver connection bags.

In an embodiment of advantageously simple construction the connector body is molded in one piece in a plastic material and its two panels provided with caviies are connected to one another by at least one flexible hinge and are detachably fastened one against the other by means of a resilient catch.

When the control device according to the invention simultaneously comprises a path switching manipulator and detachable connectors housed in a single connector body, it is advantageous for one of the two panels of the connector body to be provided with two sets of cavities, each comprising:

(1) at least three cavities in which three receiver connection bags are housed for the transmission of any control pressure to one of the two controlled members, and (2) at least three cavities in which are housed three deformable isolator bags, each respectively in communication with one of the three receiver connection bags of the corresponding set, the receiver connection bags of the two sets being connected in three independent pairs each comprising a receiver connection bag of a set in communication with a receiver connection bag of the other set via their isolator bags which are connected together by a coupling pipe into which leads a pipe connected to one of the three positioning transmitter bags of the path switching manipulator, and for the other panel of the connector body also to comprise two sets of cavities, each comprising:

(1) at least three cavities in which are housed three transmitter connection bags for the transmission of any control pressure to one of the two controlled members, and each of which is connected by a connection pipe to a respective one of the three positioning receiver bags of the corresponding controlled member, and (2) at least one cavity in which is housed at least one deformable obturating receiver bag connected by a transmission pipe to one of the two obturating transmitter bags of the path switching manipulator, in such a manner that, when the two panels are folded over and fastened one against the other, each of the three receiver connection bags corresponding to a controlled member is in the position for transmission of pressure to a respective one of the three transmitter connection bags corresponding to the same controlled member, and the obturating receiver bag or bags associated with the three transmitter connection bags corresponding to this same controlled member is or are in the position for transmission of pressure to the three isolator bags in communication with the three receiver connection bags corresponding to the same controlled member.

It will be noted that the presence of connectors in the control device makes it possible to divide each hydraulic circuit into two parts which are independent in respect of hydraulic fluid. Consequently, if a hydraulic circuit should be damaged on its transmitter side or on its receiver side, only one of the two subassemblies has to be replaced and it is not necessary to empty the hydraulic fluid from the whole of this circuit. To this end, in order to facilitate intervention for repairs and maintenance at the connector, it is advantageous for at least one of the two panels of the connector body to consist of two parts adapted to be detached, independently of one another, from the other panel, and for each of the parts to contain one of the two sets of cavities of the corresponding panel. In this case, if the two controlled members are respectively a left-hand rear view mirror and a right-hand rear view mirror, the lifting of one of the panels will give access to the bags associated with one of the rear view mirrors, while the bags associated with the other rear view mirror will be protected against any accidental action.

Another aspect of the invention relates to the hydraulic remote control device of the kind described above and of the type in which, in addition, at least one controlled member is retained on its support by ball joint articulation means permitting, on the one hand, the locking of the controlled member in position relative to its support through the friction against one another of at least two spherical dome-shaped bearing surfaces whose curvatures are complementary and which have the same center as said articulation means and are applied against one another by a locking pressure, and on the other hand the changing of the orientation of the controlled member in relation to its support through the action of an increase of the volume of at least one of the variable volume chambers of the positioning receivers interposed between said controlled member and its support. In this case, according to a characteristic specific to the invention, the control device is characterized in that it comprises at least one additional hydraulic circuit comprising an unlocking transmitter of the variable volume chamber type, which is within the reach of the user and is connected by a connection pipe to at least one unlocking receiver of the variable volume chamber type which is mounted on the support in such a manner as to develop a pressure antagonistic to the locking pressure in order to move apart said frictional bearing surfaces through an increase of the volume of said variable volume chamber of the unlocking receiver as the result of a reduction of the volume of said variable volume chamber of the unlocking transmitter. By analogy with the other variable volume chambers of the other transmitters and receivers of the device, the variable volume chambers of the unlocking transmitters and receivers each comprise at least one flexible walled deformable bag which is mounted directly in the manually actuated control member for the unlocking transmitter and is retained in at least one cavity provided in the corresponding support, for the unlocking receiver, while in addition the locking pressure is advantageously resiliently exerted on the frictional bearing surfaces.

Different shapes and arrangements can be given to the unlocking receiver bags, depending on the embodiment of the frictional bearing surfaces and, in a general way, of the ball joint articulation means.

In a first example, when the frictional bearing surfaces having the shape of spherical domes comprise a convex bearing surface formed on a plate connected to the controlled member and cooperating with a concave bearing surface which surrounds it and is formed on the support, it is advantageous for the convex bearing surface to be formed on the outer side surface of the plate whose bottom, on the opposite side to the controlled member, is provided with a hemispherical boss projecting towards the support and having a radius smaller than that of the convex bearing surface, so as to form a half-ball concentric to the convex bearing surface and engaged in a support bowl, said half-ball being held in position for rotation in the bowl by the compression applied to the convex bearing surface by a plurality of fingers, each of which is fastened at its base to the support and surrounds the convex bearing surface in such a manner that each of them defines a portion of the concave bearing surface, which in this case is discontinuous. At its base connected to the support each finger delimits, on the side facing the plate, a cavity extending in the circumferential direction and containing at least one of the inflatable sausage-shaped bladders of a string of bladders serially connected by pipes of slight inside volume and forming the variable volume chamber of the unlocking receiver, in such a manner that the inflation of the bladders in response to an unlocking command received from the corresponding transmitter moves the fingers radially apart against the return action of their natural resiliency, so as to free the convex bearing surface and permit rotation of the plate on the support through its halfball through the action of the positioning receivers.

In a second example, if said spherical domeshaped frictional bearing surfaces of the ball joint articulation means comprise a convex bearing surface formed by a plate connected to the controlled member and cooperating with a concave bearing surface surrounding the convex bearing surface and supported by a base fastened to the support, the device according to the invention is then characterized by the fact that the concave bearing surface is formed on a peripheral skirt subdivided into contiguous panels by radial slots formed in the skirt, which surrounds an annular groove formed in the base and containing the variable volume chamber of the unlocking receiver, which is composed of a flexible walled deformable bag of substantially toric shape, so that the inflation of this substantially toric bag in response to an unlocking command received from the unlocking transmitter brings about the radial opening out of the panels of the skirt in relation to the convex bearing surface and against the return action of their natural resiliency specific to the material of which they are made, in order at least partially to free the convex bearing surface from its locking in position by the concave bearing surface of the skirt and to permit its relative displacement through the action of the positioning receivers.

In a last particular example, in which the ball joint articulation means comprise a half-ball which on the one hand is engaged in a hemispherical socket in a plate connected to the controlled member, and on the other hand is fastened to a member connected to the controlled member, this connecting member being such that it passes through the bottom of the socket and is loaded by a resilient member bearing on one side against the support and on the other side bearing against the connecting member in order to exert the locking pressure, the device according to the invention is characterized by the fact that the variable volume chamber of the unlocking receiver is disposed in a cavity formed in the support in such a manner as to exert on the connecting member an action antagonistic to that of the resilient means when the deformable bag of the unlocking receiver is inflated by a reduction of the volume of the variable volume chamber of the unlocking transmitter, which chamber is in turn delimited by a flexible walled deformable bag.

Other advantages and characteristics of the invention will emerge from the description given below, without constituting a limitation, of examples of embodiment of the various aspects of the invention, which are described with reference to the accompanying drawings, in which:

FIGS. 5a and 5b are views corresponding substantially to FIGS. 2a and 2b, relating to an example of a direct contact retractable manipulator button.

FIG. 5c is a partial axial section of a component of the manipulator button shown in FIGS. 5a and 5b.

FIGS. 6a and 6b are respectively a front view and a cross-section of a first example of a linear manipulator.

FIGS. 7a and 7b are views similar to FIGS. 6a and 6b, relating to a second example of a linear manipulator.

FIG. 8a is a partial axial section of an example of an oscillating manipulator button.

FIG. 8b is a section on the line A—A of a component of the manipulator button shown in FIG. 8a.

FIG. 11a is a view similar to FIG. 10a and a view in side elevation of a control cam type pusher of a second example of a manipulator of the floating type.

FIG. 11b is a view in cross-section on the line b—b.

FIG. 13 is a view in cross-section of a hydraulic circuit connector intended for connecting a manipulator to positioning receivers of a controlled member.

FIG. 14 is a front view in elevation of the connector shown in FIG. 13, in the open position.

FIG. 16a is a partial view in cross-section of an example of an adjustable rear view mirror casing controlled by a device according to the invention, with its means for the articulation and the locking and unlocking of said rear view mirror in the casing.

FIG. 16b is a partial schematic view in section on the line c—c in FIG. 16a.

FIGS. 17a and 18a are views similar to those shown in FIG. 16a, showing two other examples of rear view mirror casings and means for the articulation and the locking and unlocking of said rear view mirror in its casing.

FIG. 17b is a partial schematic view in section on the line d—d in FIG. 17a.

FIG. 18b is a partial schematic view of the mechanism shown in FIG. 18a, and

FIG. 18c is a schematic view of a component of the mechanism shown in FIG. 18a.

Figure 1A:
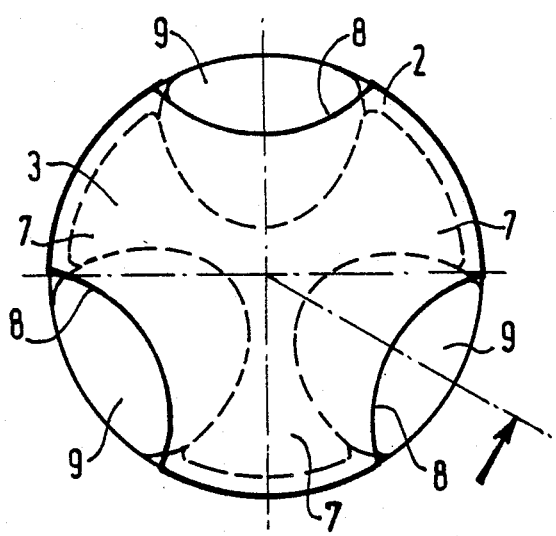
FIGS. 1a and 1b are respectively a front elevation and a partial side elevation, partly in section, of a first example of a direct contact fixed manipulator button.
Figure 1B:
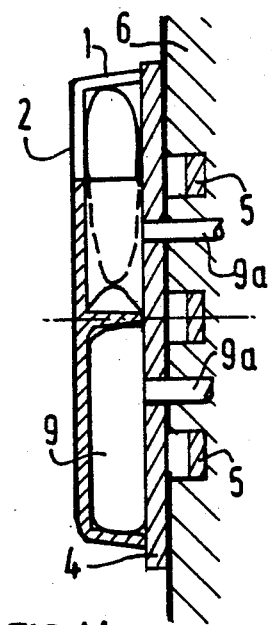

In FIGS. 1a and 1b is shown a manually actuated control member or manipulator of the fixed manipulator button type, for a hydraulic remote control device of a controlled member, which in the remainder of the present description will be an orientable external rear view mirror on an automobile vehicle. The hydraulic device for the remote control of the positioning of the rear view mirror comprises three hydraulic positioning circuits, each of which comprises a positioning transmitter consisting of a flexible walled deformable transmitter bag of a rubber-like synthetic material and in communication via a flexible tube of small diameter, which is relatively slightly elastically deformable, with a similar flexible walled deformable bag constituting a positioning receiver. The arrangement comprising the two transmitter and receiver bags and the connecting tube is filled with a certain volume of hydraulic fluid, so that if the transmitter bag is compressed its volume is reduced and hydraulic fluid contained in it is transferred under pressure through the connecting tube to the receiver bag, whose volume increases. The positioning receiver bags being retained between the orientable rear view mirror and a support, which are mechanically connected by said bags, and said rear view mirror being attached to said support by ball joint articulation means, as is described with reference to FIG. 4 in European Patent Application No. 0152219, to which reference will advantageously be made for further details of the structure of the mounting of the orientable rear view mirror in its support casing, it results that an increase in volume of one of the positioning receiver bags will give rise to the pivoting of the rear view mirror relative to its support casing, thereby entailing the compression of at least one other of the positioning receiver bags, which are distributed around the pivot center of the rear view mirror on its support, so that hydraulic fluid is transferred under pressure from said compressed positioning receiver bag or bags to the positioning transmitter bag or bags which is or are connected to it by a connecting tube.

The manipulator button shown in FIGS. 1a and 1b comprises a casing having a substantially cylindrical general external shape and consisting of a tubular side wall 1 closed at one end by a cover 2 and surrounding an internal trilobate body 3 projecting from one face of an end member 4 which has the shape of a flat disk whose other face carries projecting lugs 5 intended for resilient engagement in holes provided for the purpose in a support 6, such as the instrument panel or board. By the end of its side wall 1 on the opposite side to the cover 2 the casing is fixed by adhesive bonding, ultrasonic welding, or any other suitable method, and optionally detachably, to the periphery of the face of the end member 4 facing it. The casing, whose side wall 1 and cover 2 form one piece, for example of a relatively rigid plastic material, is thus fastened to another rigid member, likewise of plastic material, consisting of the end member 3 and the inner body 4, which also form one piece. The assembly is attached in a fixed position by clipping on the support 6. Each of the three radial arms 7 of the inner body 3 delimits, with the other two arms, concave compartments forming, in conjunction with the facing portions of the cover 2 and of the side wall 1, three sockets each of which opens to the outside of the button by way of an aperture 8 formed partly in the side wall 1 and partly in the cover 2. Each of the three sockets regularly distributed at 120° to one another around the center of the manipulator button contains a positioning transmitter bag 9, which is a deformable bag isolated in this manner from the other bags by the arms 7 and whose tube 9a connecting it to the corresponding positioning receiver passes through facing holes provided in the end member 4 and in the support 6. Each deformable bag thus protected in a rigid casing is accessible from the outside through the corresponding aperture 8, and it is sufficient for the user to apply direct pressure to the accessible portion of the flexible wall of the bag 9 to compress the latter in its socket and to transmit a hydraulic positioning control command to the corresponding receiver. Pressure can easily be applied simultaneously to two bags 9, from the front and/or the side, because of the shape and the size of the apertures 8 and also the regular distribution of the bags 9, openings 8 and arms 7 at 120° to one another and in the circumferential direction around the center of the button. This manipulator has the additional advantages that it is formed by the assembly of only two rigid parts, each of which is simple in shape and is easy to manufacture. In addition, the thickness of the manipulator button, that is to say its dimension at right angles to the support 6, is slight and its outside shapes can be adapted to the style of the instrument panel, because the casing may for example have a polygonal section.

Figure 2A:
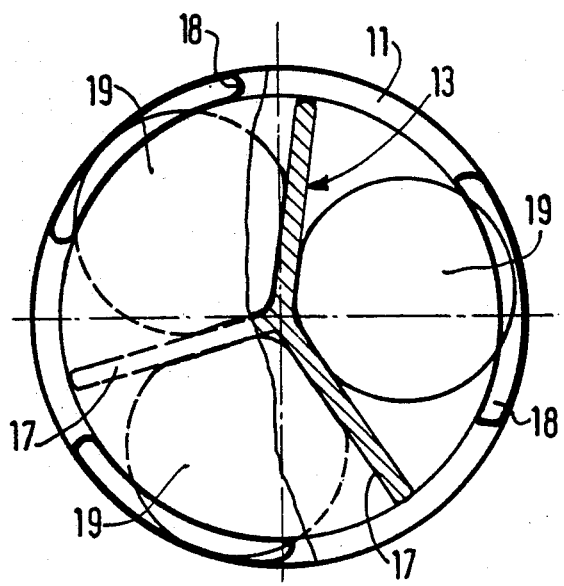
FIGS. 2a and 2b are respectively a view in cross-section and in side elevation of a second example of a direct contact fixed manipulator button.
Figure 2B:
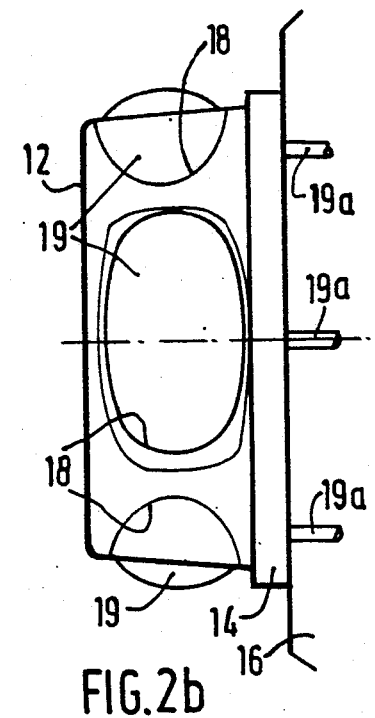

The manipulator shown in FIGS. 2a and 2b is also a fixed manipulator button for direct contact on the deformable bags, this button having numerous characteristics of identical or similar construction to those of the manipulator button described above. The essential differences are that the three apertures 18 giving access to the three deformable bags 19 are oval apertures formed solely by the side wall 11, between the cover 12 and the end member 14, and that the inner body 13 is simply composed of three radial arms 17, each in the form of a thin web, but nevertheless rigid, extending from the center to the inner face of the side wall 11. The means retaining the manipulator button on the support 16 are not shown in the drawing, but, as in the preceding example, the tubes 19a of the bags 19 pass through facing holes provided in the end member 14 and in the support 16.

Figure 3A:
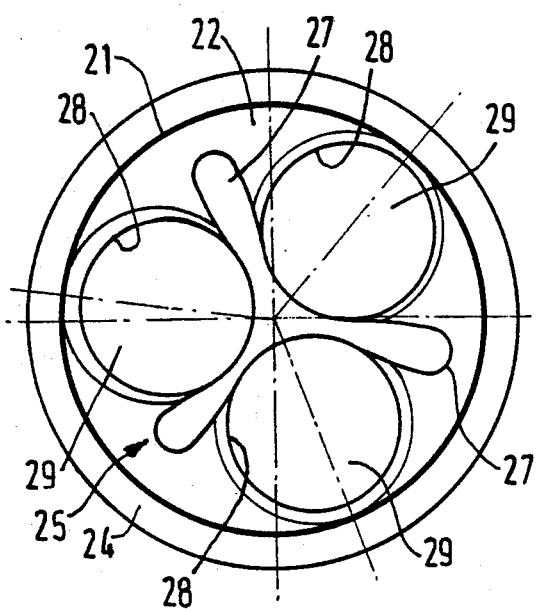
FIGS. 3a and 3b are views corresponding respectively to FIGS. 2a and 2b, showing a third example of a direct contact fixed manipulator button.
Figure 3B:
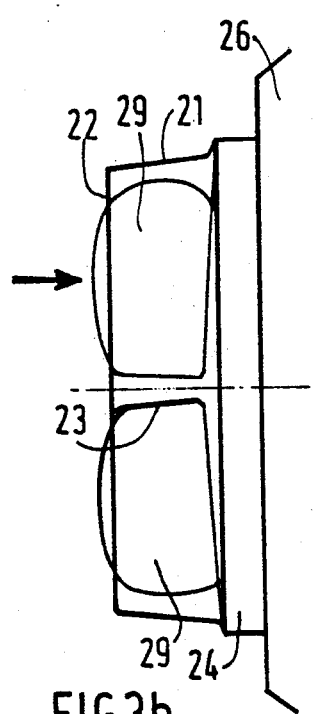

On the other hand, in the direct contact fixed manipulator button shown in FIGS. 3a and 3b, whose general construction and essential components are the same as in the two previously described examples, the apertures 28 giving access to the deformable transmitter bags 29 are circular apertures formed only in the cover 22 connected by the side wall 21, without apertures, to the end member 24 fixed on the support 26. In addition, in this example the radial arms 27 of the central body 23 do not extend as far as the inner face of the side wall 21, but nevertheless remain sufficiently large to isolate the bags 29 from one another.

The examples of manipulator buttons shown in FIGS. 2a, 2b and 3a, 3b, in which the commands are given by radial and axial pressures respectively applied to the bags accessible through the apertures, provide the same advantages as the example shown in FIGS. 1a and 1b, and can also be actuated by the user's fingertips, with good selectivity for commands.

Figure 4A:
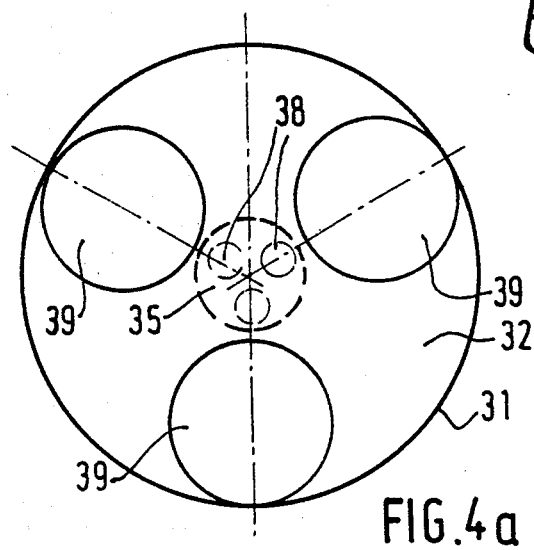
FIGS. 4a and 4b are also views respectively similar to FIGS. 2a and 2b, showing a fourth example of a direct contact fixed manipulator button.
Figure 4B:
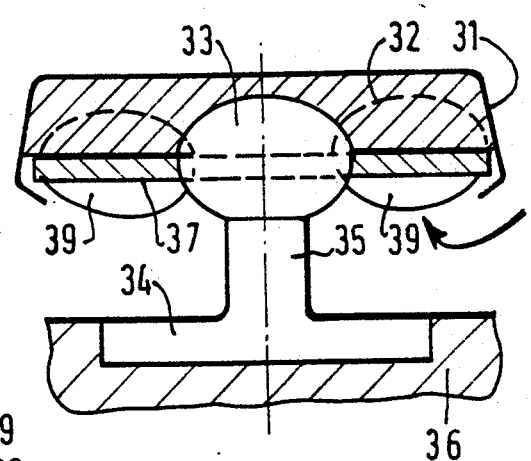

When the controlled member is a safety member oriented and/or locked in a position which must not be accidentally or inadvertently changed through inopportune compression of a deformable transmitter bag, the manipulator button used is preferably a variant of that shown in FIGS. 3a and 3b and is of the kind shown in FIGS. 4a and 4b. In these last-mentioned figures the side surface 31 is that of a cover 32 in the form of a relatively thick disk constituting a protective casing having, in its face turned towards the support or instrument panel 36, a central cavity in which is engaged and fastened a rounded core 33 fastened to the end of a rigid central rod 35 projecting from a base 34 securing the manipulator button on the support 36. In its face turned towards the base 34 and spaced apart from the latter the casing 32 is also provided with three compartments regularly distributed around the central cavity making the connection to the core 33, each of these compartments receiving a deformable transmitter bag 39, a part of which is directly accessible from the outside through a circular aperture formed in an annular plate 37 fixed around the core 33 and retaining each bag 39 in its cavity. In this example the connecting tubes of the bags 39 pass through channels formed in the central rod 35 and the core 33 and leading into the bottom of the compartments holding the bags 39. Control is therefore from "underneath", the fingertips being introduced between the base 36 and the casing 32 and at least one bag 39 being compressed towards the bottom of its compartment through the corresponding aperture in the plate 37.

In this example it is also possible for the bags 39 to be received in a hollow casing and to be separated from one another by radial arms connecting the casing to the central core 33.

In all the variants the deformable transmitter bags are housed in a rigid casing which is in the form of an upturned dish having a closed bottom and in which the bags are retained around a central rod fastened to the dish and connecting it to the base fixing the device to the support.

In FIGS. 5a to 5c another example is shown of a manipulator for direct contact on the transmitter bags, but this manipulator is in this case not of the type fixed on its support, but is retractable into the latter. As in the preceding examples, this support 46 is the instrument panel, in which is formed a circular aperture surrounded by a rim 46a having increased thickness towards the interior of the instrument panel, this aperture receiving a locking mechanism, for example of the ball type, schematically shown at 46b, serving to lock the manipulator in the extended position and also in the retracted position relative to the support 46. This manipulator comprises a tubular casing having a substantially cylindrical side wall 41, which is open at one axial end and completely closed at the other axial end by a cover 42, the peripheral portion of which is joined to the side wall 41 by a portion of increased thickness forming a shoulder 42a, which comes to bear against the external periphery of the opening in the support 46, in order to limit the retraction of the manipulator in the retracted or pushed-in position of rest in the support 46 (see FIG. 5b). The manipulator also comprises an internal body 43 provided with three arms 47 extending both radially at 120° to one another and axially, said internal body being fastened, by its opposite end to the cover 42, to an end member 44 in the form of a circular disk. Each of the three compartments defined between the arms 47 of the internal body 43 houses a deformable transmitter bag 49, whose tube 49a connecting it to the corresponding receiver bag passes through a hole formed in the end member 44. The internal body 43 and the three bags 49 housed in their compartments are surrounded by a flexible sheath 45 consisting of a sleeve composed of a thin, elastic film, whereby assembly is facilitated and the esthetic appearance of the bags 49 is improved, so that the assembly comprising the end member 44, the body 43 and the bags 49 can easily be introduced into the casing until the end member 44 comes to bear against the end of the side wall 41, which has three apertures 48 distributed regularly in the circumferential direction and centered at 120° to one another, each of them constituting an opening giving access to a compartment for the direct compression of the bag 49 contained therein. After the side wall 42 has been fastened to the end member 44, the manipulator is ready to operate. Starting from the position of rest, in which the manipulator is retracted or pushed into the support 46, as shown in FIG. 5b, when the user wishes to transmit a control command he grips the manipulator by its cover 42 and pulls it axially away from the support 46 until the end member 44 comes to strike against the rim 46a, and the locking mechanism 46b then locks the manipulator in the extended or operating position. In this position it is then sufficient for the user to compress at least one of the bags 49 through the corresponding aperture 48 by means of a finger. After the desired control command or commands have been given, the user pushes the manipulator back into the retracted position, in which it is again locked by the locking mechanism 46b.

The manipulator of this example may have numerous different shapes, particularly in respect of its crosssection, which may for example be polygonal. The casing 41, 42 and the internal body 43 serve only to support bags 49, each of which may have a volume of 1.1 cubic centimeters, for example, and may be filled before or after assembly, thus achieving good adaptation of the manipulator to the style of the instrument panel.

In FIGS. 6a and 6b an indirect contact manipulator of a so-called "linear" type is shown, comprising three pushbuttons 50 disposed side by side, each of them comprising a pusher or rocker 51 in the form of a substantially rectangular tongue, the bottom portion 52 of which projects on its outer face side and is curved on its inner face side to form a groove 53 closed on each side by two thin side webs 54 extending as far as the end of the top part 55 of the tongue, which is folded back on the inner face side. By its top curved portion 55 the pusher is mounted to rock about a transverse pin 56 which passes through said portion 55 and is common to the three pushers 51, on a common base 57 serving for fastening to the support 58, such as the instrument panel. Facing each pusher 51 the base 57 has a cavity or compartment in which is housed a deformable transmitter bag 59 retained at the bottom by a stop 57a carried by the base 57 and bounding the corresponding compartment, while the corresponding connecting tube 59a passes through a hole formed in the base 57 near the top of the corresponding bag 59. Depression of a pusher 51 causes it to pivot about the pin 56 in the direction of the base 57, and brings about the compression of the corresponding bag 59, the stop 57a then being received in the groove 53 to allow maximum compression of the bag 59. In this example also the shape of the pusher is relatively independent of its operation and may be adapted to the style of the instrument panel. The manipulator may have more than three pushbuttons, each provided with a single deformable bag, and one of them may be an unlocking or coupling transmitter bag in communication with an unlocking or coupling receiver bag which, when inflated as the result of the compression of the corresponding transmitter bag, eliminates or at least very substantially reduces the friction between two contact surfaces which by rubbing together hold the rear view mirror in a particular position. This unlocking command precedes the pivoting commands, which are thereby facilitated, as is more fully described below with reference to FIGS. 16a to 18c.

In FIGS. 7a and 7b is shown a second example of an indirect contact linear manipulator, which comprises two double pushbuttons 60 (and not three single pushbuttons 50 as in the preceding example). Each pushbutton 60 comprises a pusher 61 in the form of a rectangular tongue the bottom part 62 of which has an increased thickness and projects on the outer face side, while the central part 63 has an increased thickness and projects on the inner face side and the top part 65 is curved back on the inner face side, these three parts being connected to one another by two thin side webs 64 of triangular shape, whose largest dimension, in the direction at right angles to the outer face of the tongue 61, is at the central part 63, in a zone through which passes a transverse pin 66 which is common to the two pushbuttons 60 and about which each pusher 61 is thus rockably mounted. The pin 66 is supported by a base 67 serving for fastening on the instrument panel 68 by any suitable known means, such as for example by screw connection, clipping, adhesive bonding, etc., the base being common to the two pushbuttons 60. This base 67 has for each pushbutton 60 two cavities or compartments, each of which respectively faces one of the two corresponding halves of the pusher 61, on each side of the pin 66, and each of these two cavities houses a deformable transmitter bag 69, whose connecting tube 69a passes through a hole formed in the bottom of the corresponding cavity and through the base 67. In whichever direction the pusher 61 is rocked about the pin 66, it thus compresses a bag 69 to issue a control command to the corresponding receiver. The two bags 69 disposed between each pusher 61 and the common base 67 may have the same or different volumes. The assembly formed by the base 67 and the pushers 61 makes a rigid casing protecting each bag 69. In this example four functions can be carried out with the two double pushbuttons 60, thus making it possible to reduce the space required for the rear view mirror control manipulator, and to group an additional function, for example a coupling or unlocking command, with the three rear view mirror positioning commands. This mechanism can obviously be extended to more than two pushbuttons 60 disposed side by side and each serving two functions because it is provided with two deformable bags, and the shape of the manipulator may be adapted to the style of the instrument panel.

FIGS. 8a and 8b show an example of an oscillating manipulator 70 which comprises an oscillating pusher 71 having a head 72 by which it is engaged and guided in its pivoting movements in a tubular body 73 having a closed end portion 74 provided with a central substantially hemispherical boss 75 projecting towards the interior of the body 73 and being engaged in a hemispherical cavity formed in the end of the head 72, in order to constitute a ball joint for the articulation of the pusher 71 in the body 73. The latter effects the mounting of the manipulator 70 on a support 76, such as the instrument panel, being retained in an opening in the support 76. The oscillating pusher 71 is also provided with a thrust plate 77 which lies outside the tubular body 73 and which in its peripheral portion is shaped both as a stop projecting outwards (that is to say towards the user) in order to limit the slipping of the user's finger during operation, and as a thin skirt projecting inwards (towards the body 73 and the support 76) in order to protect the manipulator against the penetration of foreign bodies into the three deformable bags 79 housed in a cavity formed in the tubular body 73, between the inner face of its side wall on its open end side and the outer face of a thinner portion at the neck 78 which connects the head 72 to the thrust plate 77. The bags 79, each of which has a volume of 2 or 3 cubic centimeters for example, are distributed regularly in the circumferential direction around the neck 78, and each bag 79 extends for example over an arc of a circle subtended by an angle at the center of 120°. The head 72 guided by ball joint articulation at 75 on the end portion 74 of the body 73 is shaped externally (see FIG. 8b) as a deformation cam having three lobes 72a compressing the bags 79 when an eccentric thrust is exerted from outside on the oscillating pusher 71. In this ex- ample the connecting tubes 79a of the bags 79 pass between the head 72 and the body 73 and pass out of the latter via holes formed in its end portion 74. This manipulator therefore comprises only two rigid parts, namely the pusher 71 and the tubular body 73, and the three deformable bags 79, and as there is always at least one bag which is at least partly filled when the device has been assembled, the oscillating pusher 71 is not dismountable and is retained in the tubular body 73 by at least one bag as soon as the manipulator is in position.

As in the preceding examples, the bag volume is selected in dependence on the displacements intended for the controlled member. The interior trilobate cam shape of the head 72 makes it possible not only to empty the bags 79 and to make use of all the liquid contained in at least one of them, but also to give priority to displacements along certain axes when each lobe 72a faces a bag 79, or else to displacement of the controlled member, for example the rear view mirror, along two axes at the same time when the lobes 72a of the head bear partly against two bags 79 simultaneously.

Figure 9:
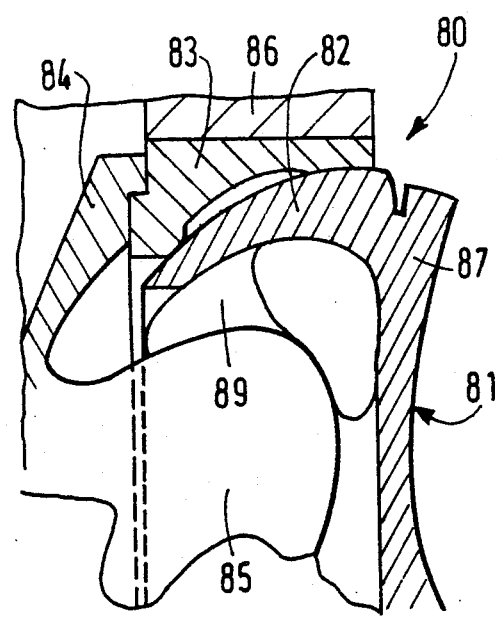
FIG. 9 is a view similar to FIG. 8a, showing a second example of an oscillating manipulator button.

FIG. 9 shows a second example of a manipulator having an oscillating pusher guided by ball joint articulation in a tubular body and having a cam compressing deformable bags housed in the body. However, in this second example the tubular body 83, by which, as in the first example, the manipulator 80 is mounted in an aperture in the support 86, has a portion of its central passage which is arranged as a sliding bearing surface in the form of a concave spherical dome cooperating with a sliding bearing surface in the form of a concave spherical dome having complementary curvature and formed on the external side surface of a tubular skirt 82 which at the same time forms the cam of the pushbutton 81. The latter comprises, in addition to the tubular skirt 82 engaged in the tubular body 83, a thrust plate 87 outside the body 83, on the side of the center of curvature of the concave bearing surface of the body 83. On the opposite side to the thrust plate 87 the body 83 is closed by an end member 84, the central part of which supports a bulb-shaped boss 85 which projects towards the interior of the body 83 and is engaged with considerable radial clearance in the skirt 82. In this way the inner surface of the skirt 82 and the outside surface of the central boss 85 define between them an annular cavity housing three deformable transmitter bags 89 regularly distributed around the boss 85 in the circumferential direction, each of them extending substantially over an arc of a circle subtended by an angle at the center of 120°. The tubes (not shown) connecting the transmitter bags 89 to the corresponding positioning receivers pass between the skirt 82 and the central boss 85 and through holes formed in the end member 84. Any eccentric pressure applied by the user to the thrust plate 87 of the oscillating pusher 81 will thus bring about a pivoting movement of the latter in the body 83 by the skirt 82, which will thus compress at least one bag 89 against the central boss 85, thereby effecting the transfer of a volume of hydraulic fluid under pressure to the corresponding rear view mirror positioning receiver or receivers.

As in the preceding example, the volume of each bag 89 may be of the order of 2 or 3 cubic centimeters and may be adapted to the positioning movements necessary for the rear view mirror, while no locking of the oscillating pusher in position is provided. Moreover, the external shape of the manipulator may be adapted to the style of the instrument panel, and finally the manipulator cannot be dismounted after its components have been placed in position and the pockets 89 have been filled. On the other hand, in the example shown in FIG. 9 the bags 89 must be filled with hydraulic fluid after it has been installed in position, and the mechanism comprises three rigid members, namely the oscillating pushbutton 81, the body 83, and the end member 84 with its boss 85, said end member 84 being attached to the body 83, whereas in the example shown in FIGS. 8a and 8b the mechanism comprises only two rigid members and the bags can be filled before or after installation.

Figure 10A:
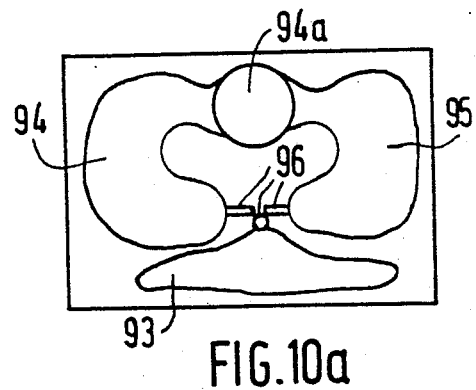
FIGS. 10a and 10b are plan views respectively a first and a second component of a manipulator of the so-called floating type.
Figure 10B:
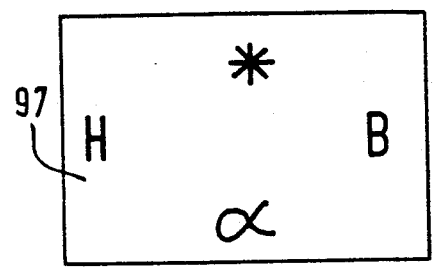
Figure 10C:
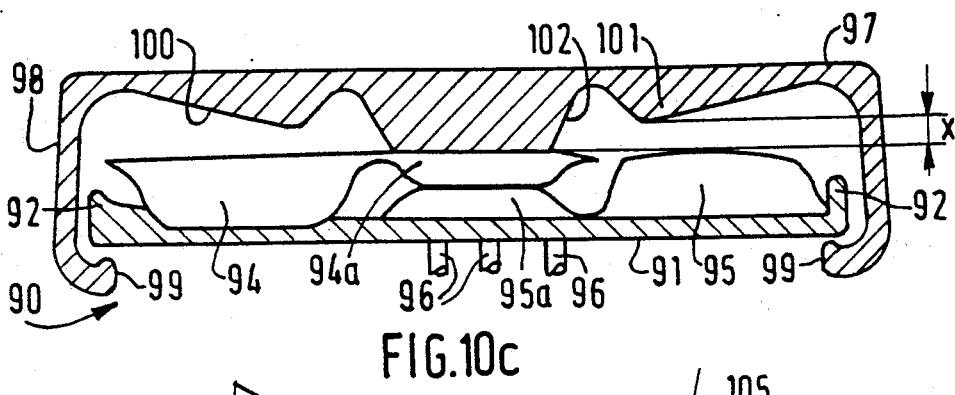
FIG. 10c is a view in cross-section of the floating manipulator consisting of the assembly of the components shown in FIGS. 10a and 10b.

In FIGS. 10a to 10c is shown an example of a so-called "floating" pusher type manipulator, because it is composed of a substantially flat pusher, shown in plan in FIG. 10b, mounted for movement on the one hand with limited clearance parallel to its plane and on the other hand over a useful path at right angles to its plane, in relation to a base shown in plan view in FIG. 10a.

This manipulator 90, shown in cross-section in FIG. 10c, comprises a base 91 by which the manipulator is fixed on the instrument panel (not shown) and which has the shape of a rectangular bowl having a substantially flat bottom and surrounded by a rim 92 of relatively slight thickness. Three cavities are formed in the top or inner face of the base 91, each partly housing one of the three deformable transmitter bags of the manipulator, one of which bags is a bottom central bag 93 (in FIG. 10a) while the other two are side bags 94 and 95 which are substantially C-shaped with their concavities facing one another and which partly overlap by an end portion 94a of the bag 94, disposed above an end portion 95a of the bag 95, the overlap being situated in the central portion of the base 92, on the opposite side to the bag 93, while the three connecting tubes 96, each connecting one of the bags to the corresponding positioning receiver, pass through holes formed in the central portion of the bottom of the base 92, in the zone delimited between the three bags 93, 94 and 95, each of which is retained in its cavity which in plan view has the shape of a corresponding depression. The pusher 97 is shaped as a rectangular cover having dimensions slightly greater than those of the base 91 and being flat on its outer face; on its periphery it has a rim 98 projecting on its inner face side and provided at its bottom end with a peripheral bead 99 which projects towards the interior of the cover 97 and by which it is resiliently clipped over the periphery of the base 91, in such a manner that the cover can move, relative to said base, in a direction allowing compression of the bags 93, 94 and 95 enclosed between the base 91 and the pusher 97 and also, with slight clearance, in the plane at right angles to that direction. In order to compress the bags selectively, the pusher 97 has projecting from its bottom face four cams of which one, not visible in the section shown in FIG. 10c, is directly vertically above the bag 93, while the other three, visible in section in FIG. 10c, are a lateral cam 100 of substantially triangular section, vertically in line with the side portion of the bag 94, a lateral cam 101 of trapezoidal section with its short base facing downwards and vertically in line with the side portion of the bag 95, and a central cam 102, likewise of trapezoidal section, vertically in line with the superposed portions 94a and 95a of the two bags 94 and 95. This central cam 102 is the thickest, and its thickness is such that in the position of rest, when no pressure is applied to the pusher 97, the cam 102 is flush with the bag portion 94a.

The shapes of the cams 100, 101 and 102 and of the cam not shown in the drawings are such that they make it possible to utilize the entire volume of hydraulic fluid required for the movements of the rear view mirror, in cooperation with the bags, whose volumes may vary between 0.5 and 2 cubic centimeters, for example, and after an approach stroke -x which is practically zero for the cam 102 and still short for the other three cams. This manipulator, which comprises only two rigid parts which can be adapted to the style of the instrument panel and the installation of which is easy, makes it possible, because of the three bags of which two are partly superposed and of the four cams, to serve four different functions of which, as in the preceding examples, three are functions for the positioning of the rear view mirror by pivoting in particular directions, through compression of the bag 93 and the non-superposed portions of the bags 94 and 95, the compression being achieved by the application of pressure to the floating pusher 97 at the cams 100, 101 and of the cam not shown in the drawings, these positions being indicated by the symbols H, B and $\alpha$ on the top of the pusher 97. The fourth function is a special function which, in the example of application to the control of the pivoting of a rear view mirror, may be a command for the rapid placing of the rear view mirror in a predetermined position through the compression of the superposed portions 94a and 95a of the bags, this compression being effected by applying pressure to the pusher 97 at the site of the symbol *. The stroke of the pusher 97 is such that when the user applies pressure in this zone * the cams 100 and 101 of the pusher 97 are practically tangent to the bags 94 and 95. The simultaneous application of pressure to these two bags has the effect of orienting the rear view mirror along a preferential predetermined axis Y, Y' shown in FIG. 10d, which will be explained below, while the angular positioning adjustment is made by applying pressure to the zone marked $\alpha$ on the pusher 97 effecting compression of the bag 93. The ratio of the volume of the superposed bag portions 94a and 95a to the volume of each of the bags 94 and 95 is selected so that the rapid approach function is performed. If the position of the axis Y, Y' is not exactly that desired by the user, correction is made by separately compressing one of the bags 94 and 95, by applying pressure in one of the two zones marked H and B on the pusher 97.

Figure 10D:
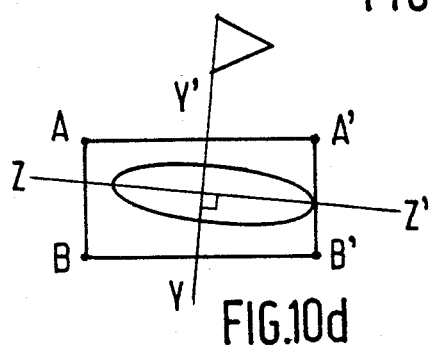
FIGS. 10d and 10e show respectively schematic views of the field of view of an external rear view mirror on a vehicle, with the adjustment axes and privileged adjustment zones, together with a view of an orientable rear view mirror of this kind controlled by the action of three positioning receivers.

In FIG. 10d the rectangle A, A', B, B' represents the envelope of the end positions of the eye of the driver of an automobile. However, in the majority of cases the driver's eye moves substantially on a preferential transverse axis Z, Z' which is slightly inclined and dependent on the driver's station and/or driving position. The axis Y, Y' is selected to be at right angles to the axis Z, Z', so that after the driver's eye returns to this axis Y, Y' through pressure applied to the rapid positioning zone *, the adjustment is completed by pivoting the rear view mirror through an angle q about this axis Y, Y', by pressure applied to the zone $\alpha$ on the pusher 97.

Figure 10E:
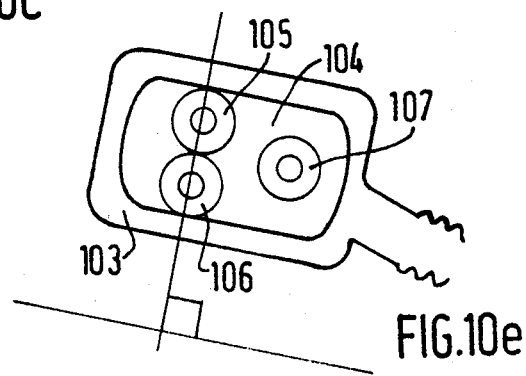

In FIG. 10e, 103 represents schematically a rear view mirror casing in which the mirror 104 is positioned by three receivers interposed between the mirror and the mirror casing. The receivers 105 and 106 are respectively connected to the bags 95 and 94, and the receiver 107 is connected to the bag 93. Pressure applied at the zone H or B controls respectively an increase of the volume of the receiver 106 or 105, thus respectively pivoting the rear view mirror up or down. By increasing the volume of the receiver 107, pressure on the zone $\alpha$ effects the pivoting of the mirror about the axis passing through the centers of the receivers 105 and 106, and pressure on the zone * controls simultaneous action on the two receivers 105 and 106, thus immediately moving the rear view mirror so that the driver's eye will be on the axis Y, Y'.

A manipulator of this kind, comprising three bags and four functions, may be extended to a manipulator having n deformable bags and n+1, n+2 ... n+p functions, if there are p overlaps of at least two bags among the n bags available in the manipulator.

In a simpler variant the bags 94 and 95 have no overlaps, so that this variant once again constitutes a manipulator having three deformable bags to control the positioning of the rear view mirror through the combination of three different commands or functions.

The manipulator 110 schematically represented in FIGS. 11a and 11b is a variant of that described above with reference to FIGS. 10a to 10c, and it functions in accordance with the same principles, that is to say it makes it possible to provide three commands for the positioning of the rear view mirror and one command for the rapid adjustment of the rear view mirror to a predetermined position. The essential difference is that the base of this manipulator 110 has an additional cavity in the central part of its bottom, and that in this additional cavity an additional deformable bag 112 is partly housed and retained, while around it are distributed a bag 113, in the bottom position in FIG. 11a and corresponding to the bag 93 in the preceding example, and two L-shaped side bags 114 and 115 which partly overlap in the top part of the base (in FIG. 11a) and which correspond to the bags 94 and 95 in the preceding example. Facing the central bag 112, which has no overlap with the other bags, the pusher 117 (see FIG. 11b) has an additional, central cam 118 in the form of a hemispherical bearing surface, the volume of which corresponds to that of the bag 112, namely for example 2 cubic centimeters corresponding to a thickness of 0.5 centimeter and a section of 4 square centimeters. The hemispherical shape of the central cam 118 makes it possible, when the pusher 117 is depressed by pressure applied to its central zone V at the central cam 118, to compress simultaneously at least one other bag 113, 114 or 115 through the pivoting of the pusher 117 on the hemispherical cam 118. The approach stroke of the hemispherical cam 118 relative to the central bag 112 is the shortest approach stroke of all the cams in relation to the corresponding bags, and the maximum stroke of this cam 118 is such that after this cam has been depressed to make its maximum stroke the cam 122, which is formed on the pusher 117 facing the superposed portions of the bags 114 and 115, on the opposite side to the cam 119 compressing the bag 113, assumes a position flush with the two superposed portions of the bags 114 and 115. The slightest pivoting of the pusher 117 through rotation on the hemispherical cam 118, as the result of pressure applied to the zone * on the pusher 117, then makes it possible to compress the superposed bags for the rapid positioning of the rear view mirror. In other respects this manipulator functions like the one in the preceding example. The manipulator shown in FIGS. 11a and 11b, comprising four bags of which two are partly superposed, and five cams, thus also serves five control functions and can be used for controlling accessories other than a rear view mirror. In the case of the control of a rear view mirror the additional function associated with the provision of the bag 112, which is the first to be compressed when the pusher 117 is operated, may be a control for the coupling or unlocking of the rear view mirror, as described below with reference to FIGS. 16a to 18c.

Like the preceding examples, this manipulator may also be adapted to the style of the instrument panel, and the relative values of the volumes of the bags may be selected in accordance with the desired strokes of the controlled member.

Figure 12:
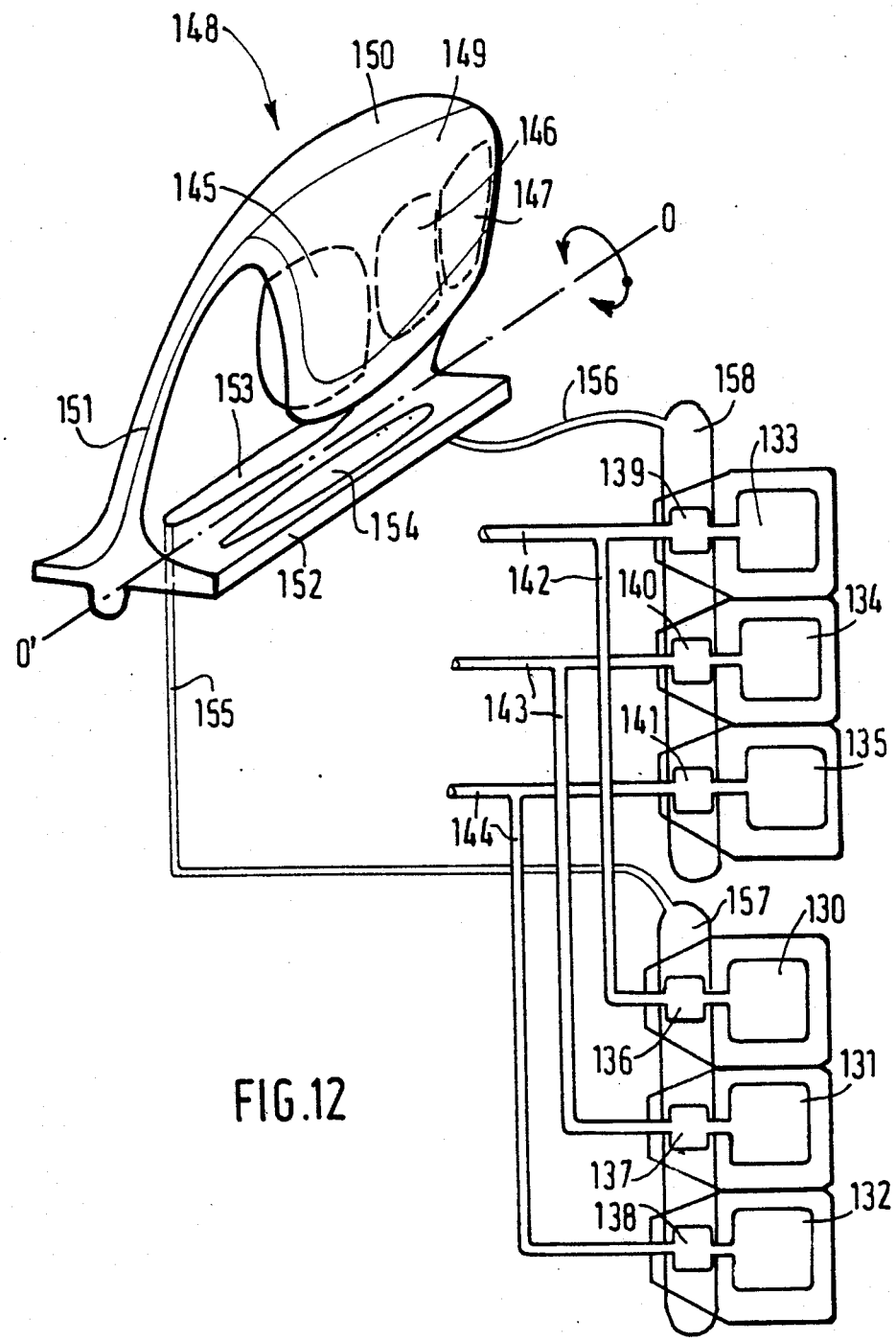
FIG. 12 is a schematic view partly in perspective and partly in the form of a circuit diagram of a direct contact, path switching pivoting manipulator.

FIG. 12 shows schematically a control device comprising a single manipulator utilizable for selectively controlling one or the other of two controlled members, for example an external rear view mirror on the right-hand side and an external rear view mirror on the left-hand side of an automobile. The position of the right-hand rear view mirror is determined by three deformable positioning receiver bags 130, 131 and 132, while the position of the left-hand rear view mirror is determined by the three deformable positioning receiver bags 133, 134 and 135. Each of the positioning receiver bags 130 to 135 is in communication via an inlet channel of slight volume with a deformable isolator bag 136 to 141 whose volume is substantially smaller than that of the corresponding positioning receiver bag, and the isolator bags 136 and 139 are connected in parallel to the same connecting tube 142, while the isolator bags 137 and 140 are connected in parallel to the same connecting tube 143, and the isolator bags 138 and 141 are connected in parallel to the same connecting tube 144. Each of the connecting tubes 142, 143 and 144 is connected to the decorresponding deformable positioning transmitter bag 145, 146 and 147 respectively, these three positioning transmitter bags being housed in the body 149, closed by a cover 150, of the path switching manipulator 148, said body 149 having three openings though each of which the user can apply direct pressure to a corresponding bag of the three positioning transmitter bags 145 to 147, each of which is housed in a corresponding compartment in the body 149. The latter is shaped as a handle attached by a tubular grip 151 to a substantially rectangular base 152 mounted for pivoting about its longitudinal axis 0, 0' on a support not shown in the drawing. On each side of the longitudinal axis 0, 0' the base 152 has one of two symmetrical oblong windows, each of which houses one of two deformable obturating transmitter bags 153 and 154, which are retained on the support and each of which is connected by one of two connecting tubes 155 and 156 to one of two deformable obturating receiver bags 157 and 158. These bags 157 and 158 are elongate deformable bags held respectively in the casing of the right-hand rear view mirror and in the casing of the left-hand rear view mirror, one of them 157 being in the pressure transmission relationship with the three deformable isolator bags 136 to 138 upstream of the deformable positioning receiver bags 130 to 132 of the right-hand rear view mirror, and the other 158 arranged to transmit pressure to the three deformable isolator bags 139 to 141 upstream of the deformable positioning receiver bags 133 to 135 of the left-hand rear view mirror. Thus, when the user pivots the manually actuated control member constituted by the body 149 and the base 152 towards the left in FIG. 12 about the axis 0, 0', the base 152 compresses the obturating transmitter bag 153 and thus via the tube 155 transfers hydraulic fluid under pressure to the obturating receiver bag 157, which increases in volume and simultaneously compresses the three isolator bags 136 to 138, which are reduced to their minimum volume, so that the three positioning receiver bags 130 to 132 of the right-hand rear view mirror are isolated from the connecting tubes 142 to 144. This has the result that any compression by the user of the positioning transmitter bags 145 to 147 in the body 149 of the manipulator 148 has no effect on the condition of the positioning receiver bags of the right-hand rear view mirror, and that only the positioning receiver bags 133 to 135 of the left-hand rear view mirror can receive control commands modifying the orientation of this left-hand rear view mirror by way of the uncompressed isolator bags 139 to 141 and of the connecting tubes 142 to 144, which pass into the tubular grip 151 for connection to the positioning transmitter bags 145 to 147. Conversely, when the manipulator 148 is pivoted to the right about the axis 0, 0' of its base, the obturating transmitter bag 154 is compressed, so that the obturating receiver bag 158 is inflated and the isolator bags 139 to 141 are compressed, with the result that the positioning receiver bags 133 to 135 of the left-hand rear view mirror are isolated from the positioning transmitter bags 145 to 147. This prevents the changing of the orientation of the left-hand rear view mirror, and only the positioning of the right-hand rear view mirror can be modified by action on the positioning transmitter bags 145 to 147 in communication via the tubes 142 to 144 and the isolator bags 136 to 138 with the positioning receiver bags 130 to 132.

This manipulator 148, which switches the control paths to the two rear view mirrors, combines the principle of the manipulator giving direct contact with three deformable positioning transmitter bags connected to three deformable positioning receiver bags of the controlled member, with the pivoting of the entire manipulator towards one side or the other, in order to permit the transmission of positioning control commands only to one or the other of two controlled members, for example to the left to control the left-hand rear view mirror and to the right to control the orientation of the right-hand rear view mirror. In relation to the positioning receiver bags 130 to 132 and 133 to 135 the small isolator bags 136 to 138 and 139 to 141 respectively serve as valves preventing the hydraulic fluid from the positioning transmitter bags 145 to 147 from penetrating respectively into the positioning receiver bags 130 to 132 and 133 to 135 when respectively the obturating receiver bag 157 or 158 is inflated by the compression of respectively the obturating transmitter bag 153 or 154. In this example the volume of the positioning transmitter bags 145 to 147 is twice that of the positioning receiver bags 130 to 135, and it is quite obvious that each positioning transmitter bag 145 to 147 is connected in parallel to the two positioning receiver bags which control the positioning in the same direction of the two orientable rear view mirrors.

In FIGS. 13 and 14 is shown a connector used to connect connecting tubes which in the absence of this connector would be too long and too difficult to instal between deformable transmitter bags and corresponding deformable receiver bags, for example positioning bags of a rear view mirror. Moreover, as already stated in the previously mentioned European patent application, an advantage connected with the presence of a connector of this type is that, in the event of damage to a hydraulic circuit in that part of the circuit which is situated on the transmitter bag side or in that part of the circuit which is situated on the receiver bag side, only the defective part has to be replaced. A connector of this kind thus makes it possible to connect and to separate the two complementary parts of a hydraulic circuit without having to empty the transmitter and/or receiver bags.

This connector 160 comprises a one-piece molded body of synthetic material, consisting of two panels 161 and 162 hinged to one another by a flexible hinge consisting of a narrow tongue 164 between two parallel lines 165 of reduced thickness of material, which form the fold axes X, X' and Y, Y'. One of the panels forms a base 161, whose outer face carries projecting lugs 166 for fastening by resilient clipping onto a support 167, and whose edge opposite to the flexible hinge 163 carries two hooks 168 which are elastically deformable to permit the releasable closing of the body when the panel 162 is folded over against the base 161 to form a lid and the hooks 168 are resiliently clipped over the edge of the lid 162 on the opposite side to the hinge 163, as shown in cross-section in FIG. 13. Each of the two panels 161 and 162 is provided in its inner surface with three cavities or depressions of rectangular shape, and each of the three cavities in one of the panels comes to face a corresponding cavity in the other panel when these two panels are folded together and fastened one against the other. Each of the cavities in the panel 161 houses a deformable bag 169 of corresponding shape, whose connecting tube 169a passes through one of the cutouts provided for the purpose in the edge of the panel 161. Similarly, deformable bags 170 are housed in the three cavities in the panel 162, and their connecting tubes 170a also pass through cutouts formed in the edge of this panel 162, on the opposite side to that on which the tubes 169a pass out of the connector. When the two panels 161 and 162 are fixed one against the other, which means that the connector is closed, the bags 170 are each compressed against one of the bags 169, so that the increases in volume of one entails a reduction of the other to the extent of the same volume, the bags being paired in a pressure transmission relationship. If the three connecting tubes 169a are connected to the three deformable positioning transmitter bags of a manipulator controlling the positioning of a rear view mirror, the bags 169 will constitute connecting receiver bags whose increases in volume will give rise to reductions of the volumes of the bags 170, which thus constitute connecting transmitter bags whose connecting tubes 170a are connected to the three positioning receiver bags of the rear view mirror in question, to which the volumes of hydraulic fluid driven out of the bags 170 of the connector are transmitted in order to effect this positioning.

A connector of this kind may be interposed between a manipulator according to the examples described with reference to FIGS. 1a to 1b and 8a to 10c and corresponding positioning receivers. However, in variants, it may comprise more than three connecting transmitter and receiver bags in order also to relay coupling or unlocking commands in conjunction with manipulators according to FIGS. 7a, 7b and 11a, 11b. Finally, it may be disposed between the isolator bags 136 to 138 and 139 to 141, on the one hand, and the bifurcation points of the tubes 142 to 144, on the other hand, in a control device according to FIG. 12.

Figure 15:
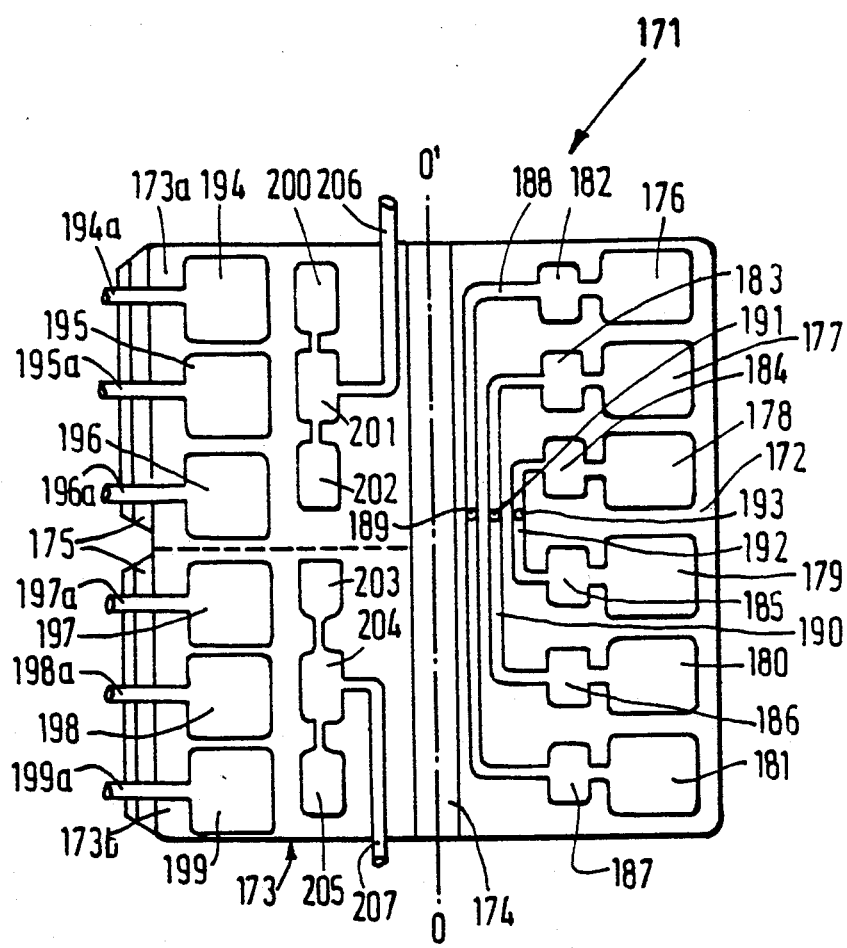
FIG. 15 is a schematic view, in the open position, of a connector for a device comprising a path switching manipulator.

Nevertheless, in order to suit a device equipped with a path switching manipulator, an adapted variant of connectors is proposed, which is schematically illustrated in FIG. 15.

Like the preceding example, this path switching connector 171 comprises a single connector body molded in one piece in a synthetic material and consisting of two panels 172 and 173, which are substantially rectangular in plan view and are hinged to one another, substantially about an axis 0, 0', by a flexible hinge 174, one of the panels constituting a base 172 for fastening the connector by any appropriate means, for example by resilient clipping, to a support (not shown), while the other panel forms a lid 173 carrying releasable fastening means, likewise of any suitable known type, such as resilient clip hooks 175, for fastening the lid 173 against the base 172, by clipping said hooks 175 over the edge of the base 172 on the opposite side to the hinge 174. Similarly, as in the preceding example, each of the panels 172 and 173 is provided in its inner surface with cavities or depressions housing deformable bags of corresponding shape, which selectively come to bear one against the other in a pressure transmission configuration when the connector 171 is closed by the fastening of the lid 173 against the base 172. More precisely, as this connector 171 is intended to be mounted between, on the one hand, a path switching manipulator such as that shown in FIG. 12, comprising three deformable positioning transmitter bags 145 to 147 and two deformable obturating transmitter bags 153 and 154, and on the other hand two controlled members, such as the left-hand and right-hand external rear view mirrors of an automobile vehicle, each of which is positioned by the action of three deformable positioning receiver bags, such as the bags 130 to 132 and 133 to 135 respectively in FIG. 12, the panels 172 and 173 receive the following deformable bags:

the base 172 receives, at its edge on the side opposite to the flexible hinge 174, six deformable connecting receiver bags 176 to 181, each of which is in communication via a channel of small volume with a small deformable isolator bag 182 to 187 respectively, these bags being disposed symmetrically in groups of three on each side of the transverse median axis at right angles to the articulation axis 0,0', and in addition these bags are connected in three symmetrical pairs of bags belonging to the two groups, the isolator bag 182 being connected to the isolator bag 187 by a channel 188, at the middle of which is located the entry of the downstream end of a tube 189 making the connection to one of the positioning transmitter bags, such as the bag 145 in FIG. 12; similarly, the isolator bags 183 and 186 are in communication with each other via a channel 190 into which leads the downstream end of a tube 191 making the connection to another positioning transmitter bag, such as the bag 146 of the manipulator shown in FIG. 12, and the isolator bags 184 and 185 are in communication with one another via a channel 192 into which leads the downstream end of a tube 193 making the connection to the third positioning transmitter bag 147 of the manipulator shown in FIG. 12; the connecting receiver bags 176 to 181 being thus connected two by two to a respective one of the three positioning transmitter bags 145 to 147 of the control manipulator by means of their respective isolator bag 182 to 187, their connecting channel 188, 190 or 192, and their connecting tube 189, 191 or 193, all three of which extend at right angles to the plane of the bags and of the connector panels.

On the opposite side to the hinge 174 the edge of the cover 173 receives six connecting receiver bags 194 to 199, each of which is in communication via a respective connecting tube 194a to 199a with a corresponding positioning receiver bag of the two rear view mirrors; more precisely, the connecting receiver bags 194 and 199, which, when the connector is closed, are in pressure transmission relationship respectively with the connecting receiver bags 176 and 181 connected to the same positioning transmitter bag 145 of the manipulator shown in FIG. 12, are respectively connected by their connecting tube 194a and 199a to the positioning receiver bags 130 and 133 respectively controlling, in the same direction, the positioning of the right-hand and left-hand rear vier mirrors; similarly, the connecting transmitter bags 195 and 198, which on the closure of the connector 171 are respectively in pressure transmission relationship with the connecting receiver bags 177 and 180 connected to the same positioning transmitter bag 146 of the manipulator shown in FIG. 12, are respectively connected by their connecting tube 195a and 198a to the positioning receiver bags 131 and 134 controlling the positioning in a second direction of the right-hand and left-hand rear view mirrors respectively, and finally the connecting transmitter bags 196 and 197, which are in pressure transmission relationship respectively, with the connecting receiver bags 178 and 179 both connected to the same positioning transmitter bag 147 of the manipulator, are respectively connected by their connecting tube 196a and 197a to the positioning receiver bags 132 and 135 controlling in a third direction the positioning of the right-hand and left-hand rear view mirrors respectively. On the side where the hinge 174 is disposed, the cover 173 also houses two sets of three serially disposed obturating receiver bags, the first set comprising the obturating receiver bags 200, 201 and 202 connected in series by small channels and each situated to correspond to a respective one of the connecting transmitter bags 194 to 196 which are on the same side of the transverse median axis of the connector at right angles to the axis 0, 0', in a symmetrical arrangement, while the second set comprises the obturating receiver bags 203, 204 and 205 connected in series by small channels and each situated to correspond to a respective one of the three connecting transmitter bags 197 to 199, which are on the corresponding side of said transverse median axis of the connector 171. In addition, the central obturating receiver bag 201 of the first set is in communication via the connecting tube 206 with one of the two obturating transmitter bags of the path switching manipulator, for example with the bag 153 of the manipulator shown in FIG. 12, while the central obturating receiver bag 204 of the second set is in communication via the connecting tube 207 with the other obturating transmitter bag 154 of the same manipulator. Finally, when the connector 171 is closed, the obturating receiver bags 200 to 205 are in a pressure transfer relationship with the isolator bags 182 to 187 respectively.

In this way, when the connector 171 is closed, if the user rocks the manipulator 148 shown in FIG. 12 to the left in that figure, he compresses the obturating transmitter bag 153, thereby driving hydraulic fluid under pressure through the tube 206 to the obturating receiver bags 200 to 202, which are inflated and compress the respective isolator bags 182 to 184. This has the result that the connecting receiver bags 176 to 178 are isolated from the tubes 189, 191 and 193, and therefore from the positioning transmitter bags 145 to 147 of the manipulator. In consequence, any compression of one of the positioning transmitter bags 145 to 147 of the manipulator entails a corresponding inflation of the corresponding connecting receiver bag 179 to 181. This increase of volume of one of the bags 179 to 181 brings about a reduction of volume of the corresponding connecting transmitter bag 197 to 199 and therefore the transmission of hydraulic fluid under pressure to the corresponding positioning receiver bag 133 to 135 of the lefthand rear view mirror in FIG. 12, and the transmission of any positioning command to the right-hand rear view mirror is impossible. Conversely, if the user rocks the manipulator 148 shown in FIG. 12 to the right, he compresses the obturating transmitter bag 154, thereby inflating the obturating receiver bags 203 to 205 through the transfer of hydraulic fluid under pressure through the tube 207. The inflation of the bags 203 to 205 gives rise to the compression of the isolator bags 185 to 187 and to the reduction of their volume to a minimum value preventing any communication between the connecting receiver bags 179 to 181 and the tubes 189, 191 and 193 making the connection to the three positioning transmitter bags 145 to 147 of the manipulator. Consequently, the connecting receiver bags 179 to 181 are isolated and cannot change in volume, and the same is thus also true of the connecting transmitter bags 197 to 199, so that no command for the positioning of the right-hand rear view mirror can be transmitted to the latter. On the other hand, any compression of the positioning transmitter bags 145 to 147 of the manipulator entails an inflation of the corresponding connecting receiver bags 176 to 178 and therefore a corresponding reduction of the volume of the corresponding connecting transmitter bags 194 to 196, so that fluid under pressure is transmitted to the corresponding positioning receiver bags 130 to 133 in order to control the orientation of the right-hand rear view mirror.

In order to permit access to the different bags of the connector which correspond to one of the two rear view mirrors, while retaining the protection provided by the body of the connector 171 for the bags corresponding to the other rear view mirror, the cover 173 of the connector is subdivided into two halves 173a and 173b which adjoin one another along the transverse median axis of the connector 171, as shown by a broken line on the cover 173, each half of the latter carrying one of the two hooks 175 for resilient clipping to the base 172.

Comparison of the connector shown in FIG. 15 with that shown in FIGS. 13 and 14, and also with the control device shown in FIG. 12, makes it possible to see that the isolator bags 136 to 141 and the obturating receiver bags 157 and 158 of the control device shown in FIG. 12, which are installed just upstream of the corresponding positioning receiver bags 130 and 132 and 133 to 135 of the two rear view mirrors and in the casings or protective housings of said mirrors, have been replaced respectively by isolator bags 182 to 187 and obturating receiver bags 200 to 205 disposed in the connector respectively just upstream of connecting receiver bags 176 to 181 which correspond to the bags 169 of the connector shown in FIG. 14, and for the obturating receiver bags 200 to 205 just close to the connecting transmitter bags 194 to 199 which correspond to the bags 170 of the connector shown in FIG. 14.

Consequently, the path switching connector shown in FIG. 15 provides two advantages: firstly, it makes it possible to reduce the length of the tubes connecting the obturating transmitter bags to the obturating receiver bags, and above all it makes it possible to reduce the space directly required by the set of bags in the casing or housing of the rear view mirror, these bags being limited to the positioning receiver bags and also optionally one or more coupling or unlocking bags, as will be described below with reference to FIGS. 16a to 18c.

Figures 16A, 16B:
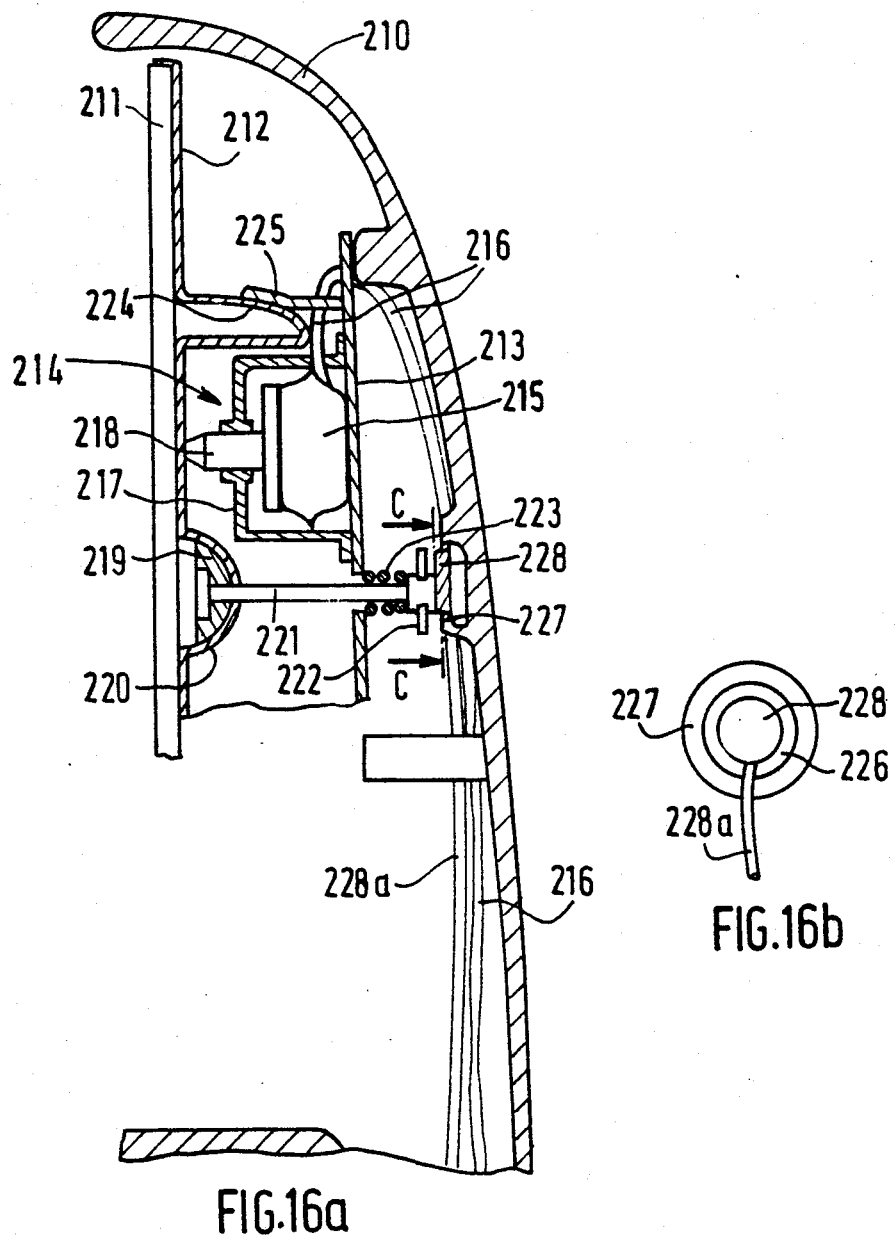

In FIG. 16a is shown schematically part of an external vehicle rear view mirror the positioning of which is controlled by a hydraulic remote control device according to the invention, said rear view mirror being of the type shown in FIG. 4 of European Patent Application No. 0152219, with which it has numerous structural characteristics in common, and reference will advantageously be made to the description of this European patent application for further details of the method of operation, which is almost identical to that of the rear view mirror shown in FIG. 16a. This rear view mirror comprises a casing 210, curved to reduce aerodynamic drag and to form on its concave side a cavity in which a mirror 211 is fixed by its rear face on a plate 212, which is on the one hand retained by articulation means on a support 213 fixed inside the casing or housing 210, and on the other hand is displaceable relative to said support 213 by three positioning receivers, such as that indicated as a whole by the reference 214. This receiver comprises essentially a deformable positioning receiver bag 215 connected by the connecting tube 216 directly or indirectly (by means of a connector of the type described above) to a positioning transmitter bag of a manipulator, likewise of the type described above. The positioning receiver bag 215 is disposed in a cylinder 217 fixed on the support 213 and provided, on the mirror 211 side, with an axial guide bore for the portion of smallest diameter of a stepped piston 218, whose portion of largest diameter is received in the cylinder 217 and bears against the bag 215, which in turn bears against the support 213, so that if the volume of the bag 215 increases as the result of the compression of the corresponding posititioning transmitter bag, the piston 218 will be pushed back towards the mirror 211 and the plate 212 and will in turn push these two members back towards the outside, thereby correspondingly modifying the orientation of the mirror 211 relative to the support 213 through the action of the articulation means, the latter comprising on the one hand a half-ball 219 received in a central hemispherical bowl 220 on the plate 212 and mounted around a rod 221 which passes through an aperture in the bottom of the bowl 220 and an aperture in the support 213, the end of which rod nearest the casing 210 is fastened to a radial cup 222. A helical compression spring 223 surrounds that portion of the rod 221 which extends between the support 213 and the casing 210, and this spring 223 bears at one end against the support 213 and at the other end against the cup 222, in such a manner as to urge the rod 221 axially towards the casing 210 and therefore to urge the half-ball 219 axially towards the bowl 220 on the plate 212, thus holding the latter against the piston 218 and pushing said piston back against the bag 215. In addition, the articulation means comprise two frictional bearing surfaces in contact with one another to hold the mirror 211 in the position which it occupies after a displacement through the action of receiver bags, such as 215, one of these two frictional bearing surfaces being a surface having the shape of a convex spherical dome 224 formed on the plate 21 and projecting towards the casing 210 concentrically to the half-ball 219, while the other frictional bearing surface is a surface having the shape of a concave spherical dome 225 formed on the support 213 and projecting towards the mirror 211, likewise concentrically to the half-ball 219. In an arrangement of this kind it is clear that the spring 223 has the effect of holding the frictional bearing surfaces 224 and 225 in contact with one another, thus offering substantial resistance to forces effecting the pivoting of the plate 212 on the bowl 220, about the half-ball 219. In order to eliminate, or at least substantially reduce, this pivoting of the mirror 211 and its plate 212 relative to the support 213, the casing is provided, facing the cup 222 and the end of the rod 221, with a circular cavity 226 (see FIG. 16b) formed in a thickened portion 227 of the casing 210, and a deformable unlocking receiver bag 228 having a flexible wall is housed in the cavity 226 and connected by a connecting tube 228a to a deformable unlocking transmitter bag, such as for example the bag 112 of the manipulator shown in FIG. 11a. In this way, compression of said unlocking transmitter bag entails a reduction of its volume, thus directly or indirectly (optionally with the aid of a connector) bringing about an increase of the volume of the unlocking receiver bag 228, which has the effect of applying to the bowl 222 and to the rod 221 a load antagonistic to the action of the spring 223, thereby tending to remove all contact on the one hand between the half-ball 219 and the bowl 220, and on the other hand between the two frictional bearing surfaces 224 and 225.

This has the result that the pivoting movements of the bowl 220 formed on the plate 212 around the half-ball 219, through the action of the increases of volume of the positioning receiver bags 215 are facilitated. This device therefore has very great sensitivity to control commands. After the release of the unlocking transmitter bag, the spring 223 compresses the unlocking receiver bag 228 to restore frictional contact between the bearing surfaces 224 and 225, and between the half-ball 219 and the bowl 220, thereby locking the mirror and its plate in the position occupied by them at that moment. In this device the calibration of the spring 223 makes it possible to obtain more or less considerable friction between the bearing surfaces 224 and 225, and also to eliminate all risk of vibration of the mirror 211 and of its plate 212, while retaining very flexible adjustability with very slight loads on the positioning bags, such as 215, when the device is uncoupled by inflation of the unlocking bag 228.

Figures 17A, 17B:
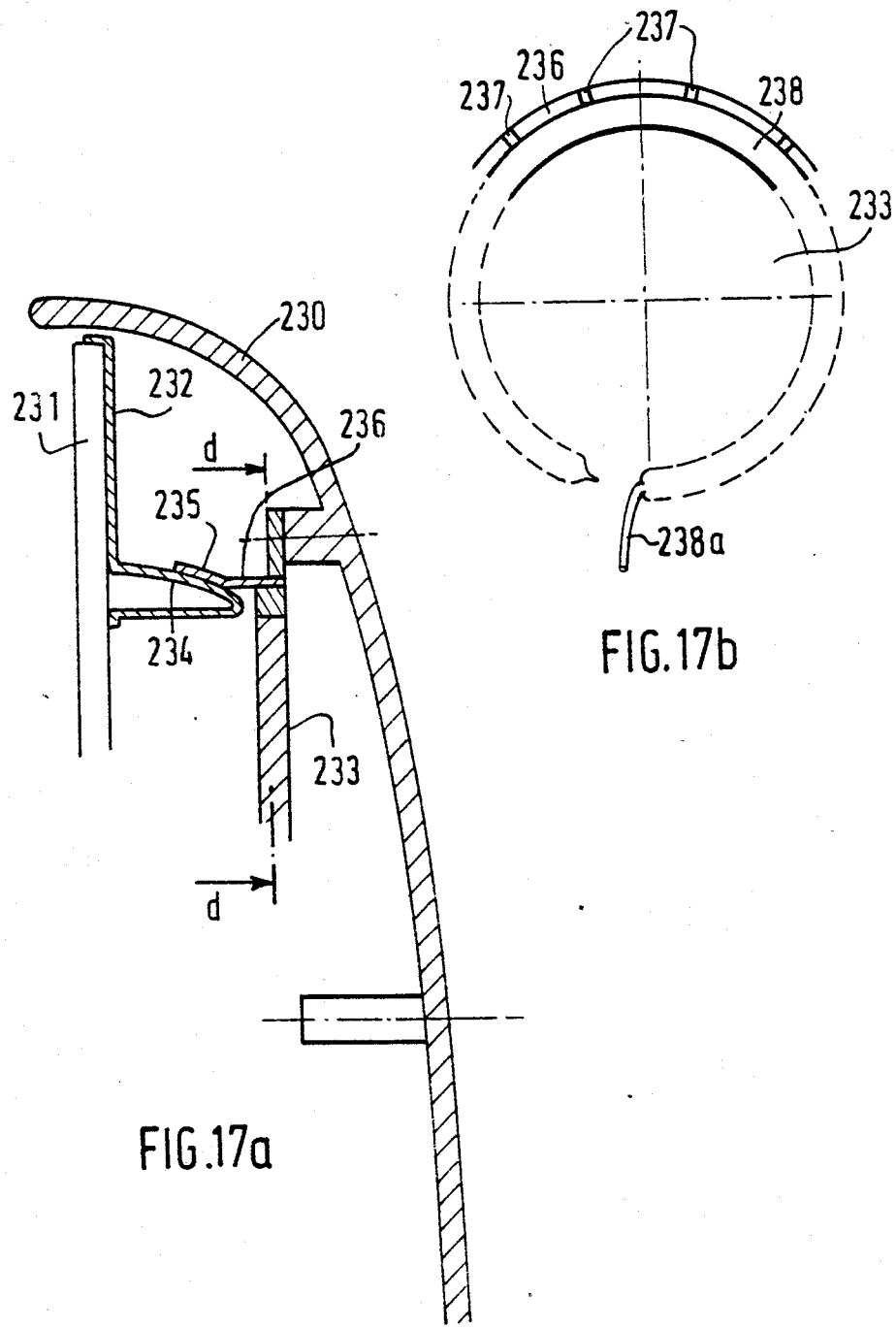

FIGS. 17a and 17b show schematically part of a variant of the rear view mirror shown in FIG. 7a, which differs from the latter essentially in respect of the construction of the components of the unlocking or coupling-uncoupling mechanism. This variant once again comprises a rear view mirror casing 230 in which the mirror 231 is fixed on a plate 232 held on a support 233 inside the casing 230 by ball joint articulation means, and also a convex frictional bearing surface 234 shaped as a spherical dome projecting from the plate 232 on the side facing the casing 230, and cooperating with a concave frictional bearing surface 235, likewise in the form of a spherical dome, which surrounds the bearing surface 234 and is supported by the support 233 and projects towards the plate 232. The characteristics specific to this variant consist in that the concave bearing surface 235 is formed on the axially external part of the radially internal face of a skirt 236, which on the one hand is disposed on the periphery of the support 233 in the form of a base arranged as a circular disk, and on the other hand is subdivided into panels and segments, curved and contiguous and separated from one another by radial slots 237 provided in the skirt and regularly distributed around an annular groove formed in the periphery of the circular base 233. This groove contains the unlocking receiver bag 238, which is a deformable, variable volume bag having a thin wall and in the form of an elongate sausage curved in the groove in such a manner as to form a toric bag constituting an almost complete loop connected to the deformable unlocking transmitter or control bag by the connecting tube 238a at one end of the sausage (see FIG. 17b). When the unlocking transmitter bag is compressed, the unlocking receiver bag 538 is inflated, thus effecting the radial opening out of the panels of the skirt 236 and of the concave segments 235 relative to the convex bearing surface 234 and against the elastic return action of said skirt panels and segments tending to return them to the original position, the skirt being made of an appropriate synthetic material. The convex bearing surface 234 is thus freed from its contact under pressure with the concave segments 235, thereby allowing its relative displacement together with the plate 232 and the mirror 231 through the action of the positioning receivers, not shown but also mounted in the rear view mirror between the base 233 and the plate 232. This variant has the advantage that it does not have the rod 221, the cup 222, and the spring 223 which are necessary in the preceding example.

FIGS. 18a to 18c show another variant of a rear view mirror having an unlocking or coupling-uncoupling mechanism facilitating the action of the positioning receivers, and comprising only two relatively rigid members in addition to the unlocking receiver. This variant comprises once again a casing 240, in which the mirror 241 is fixed on a plate 242 having a thickened central portion 243 forming a body of revolution, whose base 244 facing the casing 240 has a central hemispherical boss 245 projecting towards the casing 240 and engaged as a ball joint in a cavity having the shape of a spherical dome in a boss or bulge 245 projecting from the bottom of the casing 240. The side surface of the central portion 243 of the plate 242 forms a frictional bearing surface 247 in the form of a convex spherical dome having the same center as the hemispherical boss 245 and cooperating with a concave frictional surface discontinuously surrounding the convex bearing surface 247 and delimited on the inner, concave faces, shaped as portions of a spherical dome, of fingers 248 regularly distributed around the bearing surface 247, each finger being fastened to the casing 240 by its foot 249, which is of reduced thickness and which, on the side facing the convex bearing surface 247, delimits a cavity having the form of an arc of a circle in the circumferential direction around the central portion 243 of the plate 242. Each of these cavities houses one of the inflatable cylindrical sausage-shaped bladders 250 of a string of such bladders connected in series by small channels 251 having a small internal volume, as shown in FIG. 18c, to form the deformable unlocking receiver bag of this device. The inflation of these sausage-shaped bladders 250 through the compression of a corresponding unlocking control or transmitter bag results in the radial spreading out of the fingers 248 against the action of their elastic return which brings about the cooperation with the convex bearing surface 247 and holds the half-ball 245 against the bottom of the cavity in the boss 246. The radial spreading out of the fingers 248 frees the convex bearing surface 247 from its support against the concave bearing surface portions on the inside of the fingers 248, thereby facilitating the pivoting movements of the mirror 241 and of its plate 242 relative to the casing 240, through the action of the positioning receivers housed, for example, against the fingers 248 and the periphery of the casing 240.

In this example the center 0 of the hemispherical boss 245 having a short radius is the center of rotation of the mirror 241 and of its plate 242, as well as the center of the convex surface 247 having a long radius and of the envelope of the concave surface portions on the inner faces of the four or six fingers 248, whose radial stroke, although short, on the inflation of the bags 250 is sufficient to make the central portion 243 movable by pivoting between the fingers 248.

I claim:

1. A hydraulic remote control device for at least one controlled member (211) movable on a support (213, 210), said device comprising:
   a manually operated control member and
   at least two hydraulic positioning circuits each comprising:
   a positioning transmitter (9), which is fluid pressure transmitter comprising a flexible walled deformable bag containing a hydraulic fluid,
   at least one positioning receiver (214), which is a fluid pressure receiver having a variable volume chamber (215), and
   at least one line (9a, 216) connecting the transmitter to the receiver, said hydraulic circuits being such that the flexible walled bag (9) of the transmitter of at least one hydraulic circuits mechanically deformed by the manual actuation of the control member, in such manner that fluid contained in it is transferred to at least one of the receivers (214) connected to it, and the receivers (214) mechanically connect the controlled member (211) to its support (213, 210) in order to modify the position of the controlled member relative to the support in response to the operation of the control member, characterized in that the flexible walled bag (9) of each transmitter is mounted directly in the manually operated control member, and in that the manually actuated control member is a direct contact manipulator button comprising a rigid casing (1, 2, 4) delimiting on the one hand an internal space for each of the flexible walled bags (9) and on the other hand at least one opening (8) directly facing at least one portion of the flexible wall of each deformable bag (9), for the purpose of permitting the deformation of each bag (9) by direct pressure applied by the user to its flexible wall.

2. A device as claimed in claim 1, characterized in that the rigid casing comprises a substantially cylindrical casing (1) closed, at least partially, on one side by a cover (2) and at least partially surrounding an internal body (3) which, together with the casing (1) and/or with the cover (2), delimits at least two but preferably three compartments, which are preferably regularly distributed over the inside periphery and each of which houses one of the flexible walled bags (9) in such a manner as to isolate it from the other bags, the openings (8) for applying direct pressure to the bags (9) being provided in the casing (1) and/or in the cover (2).

3. A device as claimed in claim 2, characterized in that the casing (1) is closed on the opposite side to the cover (2) by a face (4) which has holes formed in it for the passage of pipes (9a) connecting the deformable bags (9), and which supports the internal body (3) provided with projecting arms (7), the number of which is equal to the number of bags (9), said arms delimiting pairs of compartments housing bags (9) thus isolated from one another by said arms (7) of the internal body (3).

4. A device as claimed in claim 3, characterized in that the internal body (43), the cover (42) which has no openings, and the casing (41) whose side surface is provided with all the openings (48) for applying pressure to the deformable bags (49) are mounted for movement as a single piece in relation to a support (46) between two end positions, of which one is a retracted position in which the casing (41) is locked by a locking mechanism (46b) on the support (46) in such a manner that only the cover (42) projects outside the support (46), while the other position is an operating position in which the casing (41) projects at least partially outside the support (46), so that the openings (48) for applying pressure to the bags (49) are freely accessible to the user.

5. A device as claimed in claim 1, intended for controlling a safety member, characterized in that the rigid casing (31) is in the form of a dish which has a closed bottom and in which the deformable bags (39) are retained and disposed around a central rod (33, 35) fastened to the dish (31) and connecting it to a base (34) for fastening the manipulator on a support (36), the base (34) being spaced apart and facing at least one opening in the dish offering access to the deformable bags (39) connected to the connecting pipes which pass through the central rod (33, 35).

6. A hydraulic remote control device for at least one controlled member (211) movable on a support (213, 210), said device comprising:
   a manually operated control member and
   at least two hydraulic positioning circuits each comprising:
   a positioning transmitter (9), which is a fluid pressure transmitter comprising a flexible walled deformable bag containing a hydraulic fluid,
   at least one positioning receiver (214), which is a fluid pressure receiver having a variable volume chamber (215), and
   at least one line (9a, 216) connecting the transmitter to the receiver,
said hydraulic circuits being such that the flexible walled bag (9) of the transmitter of at least one hydraulic circuit is mechanically deformed by the manual actuation of the control member, in such manner that fluid contained in it is transferred to at least one of the receivers (214) connected to it, and the receivers (214) mechanically connect the controlled member (211) to its support (213, 210) in order to modify the position of the controlled member relative to the support in response to the operation of the control member, characterized in that the flexible walled bag (9) of each transmitter is mounted directly in the manually operated control member, and in that the manually actuated control member is a linear manipulator comprising a plurality of pushbuttons (50) disposed side by side and each having a pusher (51) mounted for pivoting about a rocking axis (56) on a base (57) fastening the pushbotton (50) to a support, at least one deformable bag (59) being interposed between each rocking pusher (51) and the base (57).

7. A device as claimed in claim 6, characterized in that the linear manipulator comprises at last three pushbuttons (50) which are disposed side by side and whose pushers (51) pivot, near one (55) of their ends and on the same side of the manipulator, about a common rocking pin (56) carried by a common base (57) in which apertures are formed for the passage of the connecting pipes (59a), each of which is connected to the single deformable bag (59) housed between each pusher (51) and the common base (57).

8. A device as claimed in claim 6, characterized in that the linear manipulator comprises at least two push-buttons (60), which are disposed side by side and each of whose pushers (61) pivots in its central part about a common rocking pin (66) carried by a common base (67) provided, opposite each pusher (61), with two apertures for the passage of the pipes (69a) connected to the two deformable bags (69) housed between each pusher (61) and the common base (67), one on each side of the rocking pin (66).

9. A hydraulic remote control device for at least one controlled member (211) movable on a support (213, 210), said device comprising:
   a manually operated control member and
   at least two hydraulic positioning circuits each comprising:
   a positioning transmitter (9), which is a fluid pressure transmitter comprising a flexible walled deformable bag containing a hydraulic fluid,
   at least one positioning receiver (214), which is a fluid pressure receiver having a variable volume chamber (215), and
   at least one line (9a, 216) connecting the transmitter to the receiver,
said hydraulic circuits being such that the flexible walled bag (9) of the transmitter of at least one hydraulic circuit is mechanically deformed by the manual actuation of the control member, in such manner that fluid contained in it is transferred to at least one of the receivers (214) connected to it, and the receivers (214) mechanically connect the controlled member (211) to its support (213, 210) in order to modify the position of the controlled member relative to the support in response to the operation of the control member, characterized in that the flexible walled bag (9) of each transmitter is mounted directly in the manually operated control member, and in that the manually actuated control member is an oscillating manipulator (70) comprising a tubular body (73) for fastening the manipulator to a support (76) and an oscillating pusher (71) guided by a ball-and-socket joint (72, 75) in the tubular body (73) and engaged in the latter by a portion forming a cam (72) deforming at least three deformable bags (79) distributed, preferably regularly, inside the tubular body (73), the oscillating pusher (71) also being provided with a push plate (77) which is disposed outside the tubular plate (77) which is disposed outside the tubular body (73) and which, when any eccentric thrust is applied to it, brings about a relative displacement of the tubular body (73) and of the pusher (71), thereby compressing at least one deformable bag (79).

10. A device as claimed in claim 9, characterized in that the portion of the pusher (71) which forms a cam is a head (72) ball-jointed on an end face (74, 75) of the tubular body (73) and attached to the push plate (77) by a thinner portion (78) which together with the tubular body (73) delimits at least one cavity housing bags (79) distributed around the head (72).

11. A device as claimed in claim 10, characterized in that the head (72) of the oscillating pusher (71) has the external shape of a cam comprising at least three lobes (72a) compressing deformable bags (79).

12. A device as claimed in claim 9, characterized in that the portion of the pusher (81) forming a cam is a skirt (82) whose external face is at least partially shaped as a convex spherical dome mounted as a ball joint in a concave spherical dome forming a bearing surface inside the tubular body (83), and the inner face of the skirt (82) delimits, in conjunction with a boss (85) engaged in the skirt (82) and fastened to the tubular body (83), at least one cavity housing deformable bags (89) distributed around the boss (85), inside the skirt (82).

13. A hydraulic remote control device for at least one controlled member (211) movable on a support (213, 210), said device comprising:
   a manually operated control member and
   at least two hydraulic positioning circuits each comprising:
   a positioning transmitter (9), which is a fluid pressure transmitter comprising a flexible walled deformable bag containing a hydraulic fluid,
   at least one positioning receiver (214), which is a fluid pressure receiver having a variable volume chamber (215), and
   at least one line (9a, 216) connecting the transmitter to the receiver,
said hydraulic circuits being such that the flexible walled bag (9) of the transmitter of at least one hydraulic circuit is mechanically deformed by the manual actuation of the control member, in such manner that fluid contained in it is transferred to at least one of the receivers (214) connected to it, and the receivers (214) mechanically connect the controlled member (211) to its support (213, 210) in order to modify the position of the controlled member relative to the support in response to the operation of the control member, characterized in that the flexible walled bag (9) of each transmitter is mounted directly in the manually operated control member, and in that the manually actuated control member is a manipulator having a pusher (97) mounted floating on a base (91) serving for fastening the manipulator to a support and having at least three cavities receiving deformable bags (94, 95, 93), facing which the pusher (97) is provided with cams (100, 101, 102) for the compression of the bags when a thrust is applied to the pusher.

14. A device as claimed in claim 13, characterized in that at least two bags (94, 95) partially overlap (94a, 95a) facing a cam (102) on the pusher (97) whose approach stroke relative to the bags is shorter, on the displacement of the pusher (97) towards the base (91), than the approach strokes of cams (100, 101) facing nonoverlapping portions of the two partially overlapping bags (94, 95).

15. A device as claimed in claim 14, characterized in that the base has an additional central cavity housing an additional central deformable bag (112), around which are distributed the other deformable bags (113, 114, 115) which are not overlapped by the central bag (112), and the pusher (117) has a central cam (118) facing the central bag (112) and provided with a spherical bearing surface in order to allow the simultaneous compression of the central bag (112) and at least one other bag (113, 114, 115), the approach stroke of the central cam (118) towards the central bag (112) being the shortest of the approach stroke of the different cams of the pusher (117) (117), while the total stroke of the central cam (118) is such that when it has been accomplished and at least two bags (114, 115) have an overlap zone, a cam (122) facing the overlap zone is flush with the overlapping portions of the two bags (114, 115).

16. A hydraulic remote control device for at least one controlled member (211) movable on a support (213, 210), said device comprising:
a manually operated control member and
at least two hydraulic positioning circuits each comprising:
a positioning transmitter (9), which is a fluid pressure transmitter comprising a flexible walled deformable bag containing a hydraulic fluid,
at least one positioning receiver (214), which is a fluid pressure receiver having a variable volume chamber (215), and
at least one line (9a, 216) connecting the transmitter to the receiver,
said hydraulic circuits being such that the flexible walled bag (9) of the transmitter of at least one hydraulic circuit is mechanically deformed by the manual actuation of the control member, in such manner that fluid contained in it is transferred to at least one of the receivers (214) connected to it, and the receivers (214) mechanically connect the controlled member (211) to its support (213, 210) in order to modify the position of the controlled member relative to the support in response to the operation of the control member, characterized in that the flexible walled bag (9) of each transmitter is mounted directly in the manually operated control member, and in that the manually actuated control member is a path switching manipulator (148) making possible the selective control of one or the other of two controlled members, the position of each of which is determined by at least two, but preferably three fluid pressure positioning receivers of the deformable receiver bag (130 to 132, 133 to 135) type, the manipulator comprising on the one hand a body (149) housing a corresponding number of fluid pressure positioning transmitters of the deformable transmitter bag (145, 146, 147) type, each of which is connected in parallel by connection pipes (142, 143, 144) to two positioning receivers each associated with one of the two controlled members, and on the other hand two fluid pressure obturating transmitters of the deformable obturating transmitter bag (153, 154) type, each of which is connected by a connection pipe (155, 156) to a fluid pressure obturating receiver of the deformable receiver bag (157, 158) type, which is held by mechanical means in a pressure transmission relationship with each of the deformable isolator bags (136 to 138, 139 to 141), the number of which is equal to the number of positioning receiver bags and each of which is situated upstream of one of said deformable positioning receiver bags (130 to 132 and 133 to 135) associated with one of the controlled members, in such a manner that the compression of an obturating transmitter bag (153, 154) transfers fluid to the obturating receiver bag (157, 158) which is connected to it and which is placed under pressure and increases in volume in such a manner as to compress simultaneously the isolator bags (136 to 138, 139 to 141) upstream of the positioning receiver bags (130 to 132 and 133 to 135) of the corresponding controlled member in order to cut communication between these positioning receiver bags and the positioning transmitter bags (145, 146, 147) of the manipulator (148) which remain in communication with the positioning receiver bags associated with the other controlled member.

17. A device as claimed in claim 16, characterized in that the body (149) of the manipulator (148) is fastened to a base (152) mounted on a support for pivoting about a pivot axis (0, 0'), on each side of which the base (152) has a cavity, each of which cavities houses, at least partially, one of the two obturating transmitter bags (153, 154) which are retained on the support, in such a manner that any pivoting of the manipulator (148) on the support, on one side or the other of the axis (0, 0'), brings about the compression of one of the obturating transmitter bags.

18. A hydraulic remote control device for at least one controlled member (211) movable on a support (213, 210), said device comprising:
a manually operated control member and
at least two hydraulic positioning circuits each comprising:
a positioning transmitter (9), which is a fluid pressure transmitter comprising a flexible walled deformable bag containing a hydraulic fluid,
at least one positioning a receiver (214), which is a fluid pressure receiver having a variable volume chamber (215), and
at least one line (9a, 216) connecting the transmitter to the receiver,
said hydraulic circuits being such that the flexible walled bag (9) of the transmitter of at least one hydraulic circuit is mechanically deformed by the manual actuation of the control member, in such manner that fluid contained in it is transferred to at least one of the receivers (214) connected to it, and the receivers (214) mechanically connect the controlled member (211) to its support (213, 210) in order to modify the position of the controlled member relative to the support in response to the operation of the control member, characterized in that the flexible walled bag (9) of each transmitter is mounted directly in the manually operated control member, and in which each of the hydraulic circuits includes at least one detachable connector comprising a deformable receiver connection bag (169) connected by a connection pipe (169a) to the deformable bag of the corresponding transmitter, a deformable transmitter connection bag (170) connected by a connection pipe (170a) to the deformable bag of the corresponding receiver, and a casing (161, 162) housing the transmitter and receiver connection bags, holding them bearing one against the other in order to that the pressure exerted on the receiver connection bag (169) will be transmitted to the transmitter connection bag (170), characterized in that the casings of the detachable connectors consist of a single connector body (160) comprising two panels (161, 162) which fold over and are detachably fastened (168) one against the other and each of which has an equal number of at least three cavities, each of which comes to face a cavity in the other panel when the two panels (161, 162) are folded over and fastened one against the other, the three transmitter connection bags (170) each being disposed in one of the three cavities in a panel (162) which come to face the three cavities in the other panel (161) in each of which cavities is disposed one of the three receiver connection bags (169).

19. A device as claimed in claim 18, characterized in that the connector body (160) is molded in one piece in a plastic material and its two panels (161, 162) provided with cavities are connected to one another by at least one flexible hinge (163) and are detachably fastened one against the other by means of a resilient catch (168).

20. A device as claimed in one of claims 18 and 19, comprising a path switching manipulator (148) according to one of claims 17 and 18, characterized in that one of the two panels (172, 173) of the connector body (171) is provided with two sets of cavities, each comprising:

at least three cavities in which three receiver connection bags (176 to 178, 179 to 181) are housed for the transmission of any control pressure to one of the two controlled members, and at least three cavities in which are housed three deformable isolator bags (182 to 184, 185 to 187), each respectively in communication with one of the three receiver connection bags of the corresponding set, the receiver connection bags (176 to 181) to the two sets being connected in three independent pairs (176–181, 177–180, 178–179) each comprising a receiver connection bag of a set in communication with a receiver connection bag of the other set via their isolator bags (182 to 187) which are connected together by a coupling pipe (188, 190, 192) into which leads a pipe (189, 191, 193) connecting to one of the three positioning transmitter bags (145 to 147) of the path switching manipulator (148), and the other panel (173) of the connector body is also provided with two sets of cavities, each comprising:

at least three cavities in which are housed three transmitter connection bags (194 to 196 and 197 to 199) for the transmission of any control pressure to one of the two controlled members and each of which is connected by a connection pipe (194a to 199a) to a respective one of the three positioning receiver bags (130 to 132 and 133 to 135) of the corresponding controlled member, and at least one cavity in which is housed at least one deformable obturating receiver bag (200-201-202, 204-204-205) connected by a transmission pipe (206, 207) to one of the two obturating transmitter bags (153, 154) of the path switching manipulator (148), in such a manner that, when the two panels (172, 173) are folded over and fastened one against the other, each of the three receiver connection bags (176 to 178, 179 to 181) corresponding to a controlled member is in the position for transmission of pressure to a respective one of the three transmitter connection bags (194 to 196, 197 to 199) corresponding to the same controlled member, and the obturating receiver bag or bags (200 to 202, 203 205) associated with the three transmitter connection bags corresponding to the same controlled member is or are in the position for transmission of pressure to the three isolator bags (182 to 184, 185 to 187) in communication with the three receiver connection bags corresponding to the same controlled member.

21. A device as claimed in claim 20, characterized in that at least one of the two panels (172, 173) of the connector body (171) consists of two parts (173a, 173b) adapted to be detached, independently of one another, from the other panel (172), each part containing one of the two sets of cavities of the corresponding panel (173).

22. A hydraulic remote control device for at least one controlled member (211) movable on a support (213, 210), said device comprising:
a manually operated control member and
at least two hydraulic positioning circuits each comprising:
a positioning transmitter (9), which is a fluid pressure transmitter comprising a flexible walled deformable bag containing a hydraulic fluid,
at least one positioning receiver (214), which is a fluid pressure receiver having a variable volume chamber (215), and at least one line (9a, 216) connecting the transmitter to the receiver,
said hydraulic circuits being such that the flexible walled bag (9) of the transmitter of at least one hydraulic circuit is mechanically deformed by the manual actuation of the control member, in such manner that fluid contained in it is transferred to at least one of the receivers (214) connected to it, and the receivers (214) mechanically connect the controlled member (211) to its support (213, 210) in order to modify the position of the controlled member relative to the support in response to the operation of the control member, characterized in that the flexible walled bag (9) of each transmitter is mounted directly in the manually operated control member, and in which at least one controlled member (211) is retained on its support (213,210) by ball joint articulation means (219, 220, 224, 225) permitting, on the one hand, the locking of the controlled member (221) in position relative to its support (213,210) through the friction against one another of at least two bearing surfaces (224, 225) in the form of spherical domes whose curvatures are complementary and which have the same center as said articulation means and are applied against one another by a locking pressure, and on the other hand the changing of the orientation of the controlled member (211) in relation to its support (213, 210) through the action of an increase of the volume of at least one of the variable volume chambers (215) of the positioning receivers (214) interposed between said controlled member (211) and its support (213, 210), characterized in that it comprises at least one additional hydraulic circuit comprising an unlocking transmitter of the variable volume chamber type, which is within the reach of the user and is connected by a connection pipe (228a) to at least one unlocking receiver of the variable volume chamber (228) type which is mounted on the support (213, 210) in such a manner as to develop a pressure antagonistic to the locking pressure in order to move apart said frictional bearing surfaces (224, 225) through an increase of the volume of said variable volume chamber (228) of the unlocking receiver as the result of a reduction of the volume of said variable volume chamber of the unlocking transmitter.

23. A device as claimed in claim 22, characterized in that said variable volume chambers of said unlocking transmitter and receiver each comprise at least one deformable flexible walled bag (228) which is mounted directly in the manually actuated control member for the unlocking transmitter and is retained in at least one cavity provided in the corresponding support (210) for the unlocking receiver, the locking pressure being exerted resiliently (223) on the frictional bearing surfaces (224, 225).

24. A device as claimed in one of claims 22 and 23, of the type in which said ball joint articulation means comprise a half-ball (219) which is on the one hand engaged in a hemispherical socket (220) in a plate (212) connected to the controlled member (211) and on the other hand is fastened to a ember (221) connecting it to the support (213, 210), this connecting member passing through the bottom of the socket (220) and being loaded by a resilient member (223) bearing on the one hand against the support (213) and on the other hand against the connecting member (221) in order to exert said locking pressure, characterized in that said variable volume chamber of the unlocking receiver is a deformable bag (228) disposed in a cavity provided in the support (210), in such a manner as to exert on said connecting member (221) an action antagonistic to that of said resilient member (223) when the deformable bag of the unlocking receiver (228) is inflated by a reduction of the volume of the variable volume chamber of the unlocking transmitter.

25. A device as claimed in one of claims 22 and 23, of the type in which said spherical dome frictional bearing surfaces (234, 235) of said ball joint articulation means comprise a convex bearing surface (234) formed on a plate (232) connected to the controlled member (231) and cooperating with a concave bearing surface (235) surrounding the convex bearing surface and supported by a base (233) fastened to the support (230), characterized in that the concave bearing surface (235) is formed on a peripheral skirt (236) subdivided into contiguous panels by radial slots (237) formed in the skirt (236), which surrounds an annular groove formed in the base and containing the variable volume chamber of the unlocking receiver, which chamber is composed of a deformable bag (238) having flexible walls and a substantially toric shape, so that the inflation of said substantially toric bag, in response to an unlocking command from the unlocking transmitter brings about the radial opening out of the panels of the skirt (236) in relation to the convex bearing surface (234) and against their elastic return action specific to the material of which the skirt is made, in order at least partially to free the convex bearing surface (234) from its locking in position by the concave bearing surface (235) of the skirt and to permit its relative displacement through the action of the positioning receivers.

26. A device as claimed in one of claim 22 and 23, of the type in which said spherical dome frictional bearing surfaces (248, 247) of said ball joint articulation means comprise a convex bearing surface (247) formed on a plate (243) connected to the controlled member (241) and cooperating with a concave bearing surface which surrounds it and is formed on the support (240), characterized in that the convex bearing surface (247) is formed on the outer side surface of said plate (243) whose bottom (244) is provided, on the opposite side to the controlled member (241), with a hemispherical boss (245) projecting towards the support (240) and having a smaller radius than that of the convex bearing surface (247) to form a half-ball concentric to said convex bearing surface and engaged in a bowl (246) on the support (240), said half-ball being held in position for rotation in the bowl by the compression applied to the convex bearing surface (247) by a plurality of fingers (248), each of which is fastened to the support (240) and surrounds said convex bearing surface (247) in such a manner that each of them defines a portion of the concave bearing surface, which is discontinuous, and each finger (248) delimiting in its zone (249) connecting it to the support (240) and on the side turned towards the plate (243) a cavity extending in the circumferential direction and containing at least one of the sausage-shaped inflatable bags (250) of a string of such bags serially connected by pipes (251) of slight inside volume and forming the variable volume chamber of the unlocking receiver, in such a manner that the inflation of the sausage-shaped bags in response to an unlocking command received from the corresponding transmitter moves the fingers (248) radially apart against their natural elastic return action, so as to free the convex bearing surface (247) and permit rotation of the plate (243) by its half-ball (245) on the support (240) through the action of the positioning receivers.

* * * * *